(12) United States Patent
Miyazaki

(10) Patent No.: US 8,107,334 B2
(45) Date of Patent: Jan. 31, 2012

(54) LASER POWER CONTROL METHOD AND OPTICAL INFORMATION RECORDING/REPRODUCING DEVICE

(75) Inventor: Atsushi Miyazaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 605 days.

(21) Appl. No.: 12/097,201

(22) PCT Filed: Dec. 11, 2006

(86) PCT No.: PCT/JP2006/324673
§ 371 (c)(1),
(2), (4) Date: Jun. 12, 2008

(87) PCT Pub. No.: WO2007/069566
PCT Pub. Date: Jun. 21, 2007

(65) Prior Publication Data
US 2009/0185464 A1    Jul. 23, 2009

(30) Foreign Application Priority Data
Dec. 12, 2005    (JP) .................................. 2005-358004

(51) Int. Cl.
*G11B 20/10* (2006.01)
*G11B 7/00* (2006.01)
*G11B 5/09* (2006.01)

(52) U.S. Cl. ........................ 369/47.5; 369/121; 369/59.1

(58) Field of Classification Search ................. 369/47.5, 369/116, 121, 59.1
See application file for complete search history.

(56) References Cited

U.S. PATENT DOCUMENTS

| | | | |
|---|---|---|---|
| 5,293,361 A * | 3/1994 | Aizawa ...................... 369/13.04 | |
| 5,495,463 A | 2/1996 | Akagi et al. | |
| 5,793,723 A | 8/1998 | Okuyama et al. | |
| 5,936,924 A * | 8/1999 | Tanaka ........................ 369/47.52 | |
| 6,661,759 B1 * | 12/2003 | Seo ............................. 369/59.11 | |
| 6,950,378 B1 * | 9/2005 | Miyazaki et al. .......... 369/47.52 | |
| 7,027,370 B2 | 4/2006 | Adachi et al. | |
| 2002/0003760 A1 * | 1/2002 | Honda ....................... 369/47.52 | |
| 2002/0018419 A1 | 2/2002 | Watabe | |
| 2002/0041541 A1 * | 4/2002 | Tsukada et al. ............ 369/30.11 | |
| 2002/0196719 A1 * | 12/2002 | Morishima ................ 369/47.53 | |
| 2003/0002407 A1 * | 1/2003 | Fujiwara ..................... 369/47.5 | |

FOREIGN PATENT DOCUMENTS
JP    2-68736    3/1990
(Continued)

*Primary Examiner* — Joseph Feild
*Assistant Examiner* — Aneeta Yodichkas
(74) *Attorney, Agent, or Firm* — Hamre, Schumann, Mueller & Larson, P.C.

(57) ABSTRACT

Control powers of a first definition group corresponding to pulse trains to form recording marks, and levels of second definition groups corresponding to the control powers of the first definition group for respective states on a recording medium are set. The laser is driven with drive values corresponding to the control powers selected from the first definition group in the selected level of the second definition group, and emission power detection values are detected. The detection values are stored for respective levels of the second definition groups, and an occurrence of obtaining the detection value is counted for each level of the second definition groups. When any of counter values exceeds a predetermined value, using the detection values stored for one level of the second definition groups corresponding to the counter value, corrected drive values are determined collectively for all the levels of the second definition groups.

13 Claims, 11 Drawing Sheets

FOREIGN PATENT DOCUMENTS

| | | |
|---|---|---|
| JP | 3-35434 | 2/1991 |
| JP | 3-295036 | 12/1991 |
| JP | 6-236576 | 8/1994 |
| JP | 7-111783 | 4/1995 |
| JP | 9-161302 | 6/1997 |
| JP | 2001-56954 | 2/2001 |
| JP | 2001-184644 | 7/2001 |
| JP | 2002-175626 | 6/2002 |

* cited by examiner

LASER POWER CONTROL METHOD AND OPTICAL INFORMATION RECORDING/REPRODUCING DEVICE

TECHNICAL FIELD

The present invention relates to a method for controlling a laser power of an optical information recording/reproducing apparatus, e.g., an optical disk apparatus for recording/reproducing data with respect to a recording/reproducing medium (an optical disk, an optical card, etc.) by using a laser (a semiconductor laser etc.).

BACKGROUND ART

To record/reproduce information with respect to a recording medium typified by an optical disk, the emission power of a laser has to be optimized for an information recording surface of the medium (described as a disk in the following). In general, the properties of a semiconductor laser vary significantly depending on ambient temperature changes or degradation. Therefore, the semiconductor laser requires a control means that enables the output of a power suitable for recording/reproducing information with respect to the disk so as to accommodate variations in the properties.

The properties of the semiconductor laser will be described briefly below. The following description gives an example that uses the semiconductor laser as a laser.

FIG. 7 shows the I-L characteristics (injection current-light intensity characteristics) of the semiconductor laser at temperatures T1 and T2. The oscillation of the laser starts when the laser is driven by a current larger than a threshold current $I_{th}$. In the oscillation region, the optical output per unit drive current increases in proportion to the quantum efficiency $\eta$.

In FIG. 7, the graphs show the threshold current $I_{th0}$ and the quantum efficiency $\eta_0$ at T1 and the threshold current $I_{th1}$ and the quantum efficiency $\eta_1$ at T2. The threshold current $I_{th}$ and the quantum efficiency $\eta$ change with the ambient temperature, and their changes differ from laser to laser. In some lasers, the threshold current $I_{th}$ and the quantum efficiency $\eta$ at T2 may be two or more times greater than those at T1 depending on temperature changes, as indicated by the graphs at T1 and T2 in FIG. 7. Thus, even if the drive current of the laser is the same, the power of the optical output emitted from the laser changes significantly with the ambient environment. Therefore, laser power control that modifies the drive current in accordance with the ambient environment generally is performed so as to adjust the power of the optical output to the intended power (see, e.g., Patent Document 1).

FIG. 8 is a block diagram showing an example of an optical disk apparatus using a conventional laser power control method. In FIG. 8, a pickup 2 provided with a laser 1 includes a front photodetector 4 that receives a light beam emitted from the laser 1 and converts the power of the light beam into an electric signal, and a driver 60.

A disk 3 is rotated by a motor 5 at a predetermined rotational speed, and data is recorded on the disk 3 in accordance with the power of the light beam output from the pickup 2. For reproduction, a photodetector 6 receives the light beam reflected by the disk 3 and converts the power of the light beam into an electric signal. Each track of the disk 3 is divided into sectors that are used as the unit of data recording, and an address area where an address for identifying the sector is recorded is placed at the beginning of each sector. The appropriate power for recording data on the disk 3 requires a plurality of levels to form a recording mark, and each of the levels differs from one track to another.

The front photodetector 4 samples and holds the power of the received light beam, converts the power into an electric signal, and outputs the electric signal to an A/D converter 7. The A/D converter 7 performs an analog-to-digital conversion of the signal input from the front photodetector 4 and then outputs the signal to a controller 8. Upon receiving the output of the front photodetector 4 via the A/D converter 7, the controller 8 determines and outputs drive values required for the laser 1 to output a plurality of recording power levels at which data is recorded on the disk 3. In this case, however, the appropriate drive values of the laser 1 differ between land track recording and groove track recording on the disk 3, as will be described later. Therefore, the controller 8 outputs the drive values corresponding to the land track recording and the groove track recording, respectively. Each of the drive values is switched by a switch 12 and supplied to the driver 60. A land/groove controller 20 outputs a land/groove signal (LGS) to the switch 12. The LGS is a control signal for switching the appropriate recording levels that differ from one track to another of the disk 3. The driver 60 drives the laser 1 in accordance with the drive values.

A DVD-RAM is known as a disk with a structure in which the appropriate power differs from one track to another, such as the disk 3. In a disk typified by the DVD-RAM, a pulse train is used to form a recording mark, and the power of the optical output emitted from a laser has a plurality of levels corresponding to the pulse train. Here, an example of three power levels will be described. For the DVD-RAM, the control powers are defined as a peak power, a bias power 1, and a bias power 2. In the following explanation, the three respective control powers are abbreviated as $P_{PK}$, $P_{B1}$, and $P_{B2}$. In the disk 3, the tracks on which data can be recorded are provided in guide grooves and on lands between the guide grooves. The guide grooves are referred to as groove tracks, and the lands between the guide grooves are referred to as land tracks. Each of the levels $P_{PK}$, $P_{B1}$, and $P_{B2}$ differs between the groove track and the land track.

In this context, the different power levels for the groove and land tracks should be described along with the levels of the control powers defined as $P_{PK}$, $P_{B1}$, and $P_{B2}$. For ease of distinction, the levels $P_{PK}$, $P_{B1}$, and $P_{B2}$ are referred to as the control powers of a first definition group. Moreover, the different power levels for the groove and land tracks are categorized by the type of tracks and referred to as the levels of a second definition group. The levels of the second definition group for the land track are represented by Land ($P_{PKL}$, $P_{B1L}$, $P_{B2L}$), and the levels of the second definition group for the groove track are represented by Groove ($P_{PKG}$, $P_{B1G}$, $P_{B2G}$).

FIG. 9 shows an example of the three power levels emitted from the laser to form a recording mark. FIG. 9(a) shows a timing waveform MRS that indicates a period during which a recording mark is formed with two levels of high (H) and low (L), and the recording mark is formed on the medium during the H level period. FIG. 9(b) shows the land/groove signal (LGS) in FIG. 8. The LGS at the L level indicates a land track section, and the LGS at the H level indicates a groove track section. FIG. 9(c) is a conceptual diagram showing power levels RPL of the optical output emitted from the laser during the H level period in FIG. 9(a). With 0 mV indicated by the broken line as a reference, three power levels $P_{PKL}$=10 mW, $P_{B1L}$=5 mW, and $P_{B2L}$=1 mW are switched at high speed. In the case of 16× speed recording, the switching between $P_{PK}$ and $P_{B1}$ occurs about every 3 ns, which is substantially in the vicinity of the time interval between the rise and fall of the pulse of the semiconductor laser.

In order to properly receive the three power levels of the optical output that are switched at high speed, a high-bandwidth light receiving element needs to be used as the front photodetector 4 in FIG. 8. However, the high-bandwidth light receiving element is very expensive, so that the cost of the apparatus is increased. Therefore, it is better to use a low-bandwidth light receiving element to suppress an increase in cost. In such a case, however, the low-bandwidth light receiving element cannot properly detect the three power levels of the optical output. As shown in FIG. 9(c), at the time of transition from the land track to the groove track, the levels of the second definition group have to be changed from Land (10 mW, 5 mW, 1 mW) to Groove (14 mW, 7 mW, 1 mW). The speed of switching these drive levels depends on the ability of the driver 60 in FIG. 8. Like the light receiving element described above, a drive circuit that can switch at a high speed of several 100 ns is very expensive. Thus, a drive circuit with a switching speed of about several μs generally is used.

FIG. 10(a) schematically shows a state in which the light beam moves along a track by the rotation of the disk. The track is divided equally into sectors, and an address area where an address for identifying the sector is recorded is placed at the beginning of each sector. Here, the address area is referred to particularly as a header area, and an area that is placed immediately after the header area is referred to as a gap area where no data to be reproduced is present and no data is recorded. Moreover, a data area for recording data follows the gap area. In FIG. 10, the vertical broken lines indicate synchronous timing with the light beam when it is located in each area of FIG. 10(a). FIG. 10(b) shows the land/groove signal (LGS) in FIG. 8. The LGS at the L level indicates that the light beam is located in the land track, and the LGS at the H level indicates that the light beam is located in the groove track.

FIG. 10(c) schematically shows levels PL of the emission power of the laser. When the three power levels required for recording are switched at high speed, as described above, while the light beam passes through the gap area, a high-speed photodetector needs to be used to monitor the output power directly with high precision. However, the use of the high-speed photodetector increases the cost of the apparatus. To avoid this, the power switching timing should be slow enough to monitor the output power. However, accurate recording cannot be performed if the power switching timing is changed during information recording. Thus, the controller 8 is operated by performing a test light emission at low speed while the light beam passes through the gap area other than the information recording.

In the following explanation, $P_{PKT}$ and $P_{BT}$ represent two power levels obtained by the front photodetector 4 in FIG. 8 as a result of the test light emission. The controller 8 can determine the quantum efficiency η and the threshold current $I_{th}$ of the laser based on the following equations.

$$\eta = (P_{PKT} - P_{BT})/(I_{PKT} - I_{BT})$$

$$I_{th} = I_{BT} - P_{BT}/\eta$$

where $I_{PKT}$ represents a drive current to output $P_{PKT}$ and $I_{BT}$ represents a drive current to output $P_{BT}$.

Substituting the resultant values of η and $I_{th}$ in the following equations, it is possible to determine drive currents $I_{PK}$, $I_{B1}$, and $I_{B2}$ that provide powers $P_{PK}$, $P_{B1}$, and $P_{B2}$ required for recording information in accordance with the I-L characteristic variations due to the ambient temperature.

$$I_{PK} = 1/\eta \times P_{PK} + I_{th}$$

$$I_{B1} = 1/\eta \times P_{B1} + I_{th}$$

$$I_{B2} = 1/\eta \times P_{B2} + I_{th}$$

When the light beam reaches the data area, the power switching timing is changed to high speed such that information can be recorded, and the drive currents $I_{PK}$, $I_{B1}$, and $I_{B2}$ calculated by the controller 8 are output to the driver 60. In this case, the drive currents are represented by Land ($I_{PKL}$, $I_{B1L}$, $I_{B2L}$) when the light beam is located in the land track and by Groove ($I_{PKG}$, $I_{B1G}$, $I_{B2G}$) when the light beam is located in the groove track.

For the land track, the drive currents can be determined by the following equations.

$$I_{PKL} = 1/\eta \times P_{PKL} + I_{th}$$

$$I_{B1L} = 1/\eta \times P_{B1L} + I_{th}$$

$$I_{B2L} = 1/\eta \times P_{B2L} + I_{th}$$

For the groove track, the drive currents can be determined by the following equations.

$$I_{PKG} = 1/\eta \times P_{PKG} + I_{th}$$

$$I_{B1G} = 1/\eta \times P_{B1G} + I_{th}$$

$$I_{B2G} = 1/\eta \times P_{B2G} + I_{th}$$

When the light beam is located at the leading end of the data area after having passed through the gap area in FIG. 10(a), the driver 60 switches between Land ($I_{PKL}$, $I_{B1L}$, $I_{B2L}$) and Groove ($I_{PKG}$, $I_{B1G}$, $I_{B2G}$) for driving within a predetermined time.

In the above explanation, as an example of the operation of the controller 8, the drive currents are determined by the operation using a processor such as a DSP or microcomputer. However, the method described in Patent Document 2 also can be applied.

Patent Document 1: JP H6(1994)-236576 A
Patent Document 2: JP H7(1995)-111783 A

DISCLOSURE OF INVENTION

Problem to be Solved by the Invention

When data is to be recorded by rotating the DVD-RAM at high speed such as 16× speed, the light beam passes through the gap area in about 340 ns. Therefore, even if the test light emission is performed by switching the power levels at low speed, the front photodetector 4 can sample each level substantially once. Moreover, since the disk is rotated at high speed, the effect of noise produced in the conversion of the power of the light beam into the electric signal by the front photodetector 4 cannot be ignored. If the front photodetector 4 is affected by noise during sampling, the values of $P_{PKT}$ and $P_{BT}$ may have an error, thus causing an error in Land ($I_{PKL}$, $I_{B1L}$, $I_{B2L}$) or Groove ($I_{PKG}$, $I_{B1G}$, $I_{B2G}$).

This error cannot be corrected until the light beam reaches the gap area in the next sector, which means that data is recorded in a period of at least one sector while the error remains present. In the DVD-RAM, if data is recorded with a power different from the appropriate power during the period of about 1 sector, the error will probably become uncorrectable. Thus, data alternations may occur frequently, or some data may be dropped. To reduce the error, the number of samples should be increased to calculate the average of the samples, e.g., by sampling a plurality of sectors. However, when data is recorded on a random-access medium such as the DVD-RAM, it is difficult to sample the same power at a plurality of times because there is no regularity as to whether the recording sector is located in the land track or the groove track. Accordingly, the levels ($P_{PKT}$, $P_{BT}$) of the test light emission have to be fixed to the power of either the land track or the groove track or to any levels that differ from both the powers.

As described above, however, the switching of the outputs of the controller 8 from $I_{PKT}$, $I_{BT}$ to Land ($I_{PKL}$, $I_{B1L}$, $I_{B2L}$) or Groove ($I_{PKG}$, $I_{B1G}$, $I_{B2G}$) takes several μs. Assuming that the switching time is 3 μs, the power is not always determined at the appropriate power while data that is dose to 4% of about 1 sector after the test light emission is recorded on the data area after the light beam has passed through the gap area. In view of an error correction unit, this also is comparable to a period of more than 0.5 sectors and can pose a problem.

With the foregoing in mind, it is an object of the present invention to provide a laser power control method that can suppress the occurrence of an error in a detected value and thus can achieve favorable control without increasing the cost of a detector and a driver under conditions that the detected value of a laser power is susceptible to noise, the power to be detected has a plurality of levels in accordance with different aspects such as the relationship between a land track and a groove track, and the plurality of levels are likely to appear at random.

Means for Solving Problem

A laser power control method of the present invention includes the following: setting each of control powers of a first definition group that correspond to a pulse train used to form a recording mark, so that data is recorded on a recording medium with the pulse train composed of laser powers of a plurality of levels; setting a plurality of levels constituting a second definition group that includes each of the control powers of the first definition group in accordance with different states of the recording medium for recording data on the recording medium; setting each of drive values for driving the laser with each of the control powers at each of the levels of the second definition group; and driving the laser by switching the drive values stepwise so that each of the control powers of the first definition group is set to be a predetermined level of the second definition group for recording data on the recording medium.

To solve the above problem, in the laser power control method of the present invention, a plurality of control powers are selected from each of the control powers of the first definition group included in the level that is selected in accordance with predetermined conditions of the second definition group, and when the laser is driven with the drive values corresponding to the selected control powers, the laser power is monitored to obtain an emission power detection value. The emission power detection value is stored for each level of the second definition group, and an occurrence is counted for each level of the second definition group in a period during which the emission power detection value is obtained. When any of counter values of the occurrence for each level exceeds a predetermined value, using the emission power detection values stored for one level of the second definition group corresponding to the counter value that has exceeded the predetermined value, corrected values of the corresponding drive values are determined collectively, and the setting of each of the drive values is updated for all the levels of the second definition group.

An optical information recording/reproducing apparatus of the present invention is configured so that data is recorded on a recording medium with a pulse train composed of laser powers of a plurality of levels, each of control powers of a first definition group that correspond to the pulse train used to form a recording mark is set, a plurality of levels constituting a second definition group that includes each of the control powers of the first definition group in accordance with different states of the recording medium for recording data on the recording medium are set, each of drive values for driving the laser with each of the control powers at each of the levels of the second definition group is set, and the laser is driven by switching the drive values stepwise so that each of the control powers of the first definition group is set to be a predetermined level of the second definition group for recording data on the recording medium.

To solve the above problem, the optical information recording/reproducing apparatus of the present invention includes the following: a photodetector that obtains an emission power detection value by monitoring the laser power output from the laser; a plurality of information storage portions that store the emission power detection value from the photodetector for each level of the second definition group; a controller that determines corrected values of each of the drive values based on the emission power detection values stored in the information storage portions, and updates the setting of each of the drive values; a driver that drives the laser based on each of the drive values; an identification information output portion that outputs identification information that identifies which level of the second definition group an irradiation position of the laser on the recording medium corresponds to; and a plurality of counters that count an occurrence for each level of the second definition group in a period during which the emission power detection value is obtained from the photodetector.

A plurality of control powers are selected from each of the control powers of the first definition group included in the level that is selected in accordance with predetermined conditions of the second definition group, and the emission power detection value is obtained when the laser is driven with the drive values corresponding to the selected control powers. The information storage portion in which the emission power detection value is to be stored and the counter in which the occurrence is to be counted in the period are selected based on the identification information. When any of counter values of the counters exceeds a predetermined value, the controller uses the emission power detection values stored for one level of the second definition group corresponding to the counter that has exceeded the predetermined value, collectively determines corrected values of the corresponding drive values, and updates the setting of each of the drive values.

Effects of the Invention

The laser power control method of the present invention uses the values obtained by detecting the emission power of a laser at a plurality of times and thus can suppress the effect of noise. Moreover, even if different aspects such as the land track and the groove track are likely to appear at random, the emission power can be detected easily and reliably at a plurality of times. By performing the detection of the emission power at a plurality of times, the switching time of drive currents of the laser during the detection of the emission power can be set sufficiently longer, so that the emission power can be detected with high precision without increasing the cost of the apparatus.

DESCRIPTION OF REFERENCE NUMERALS

Figure 1:
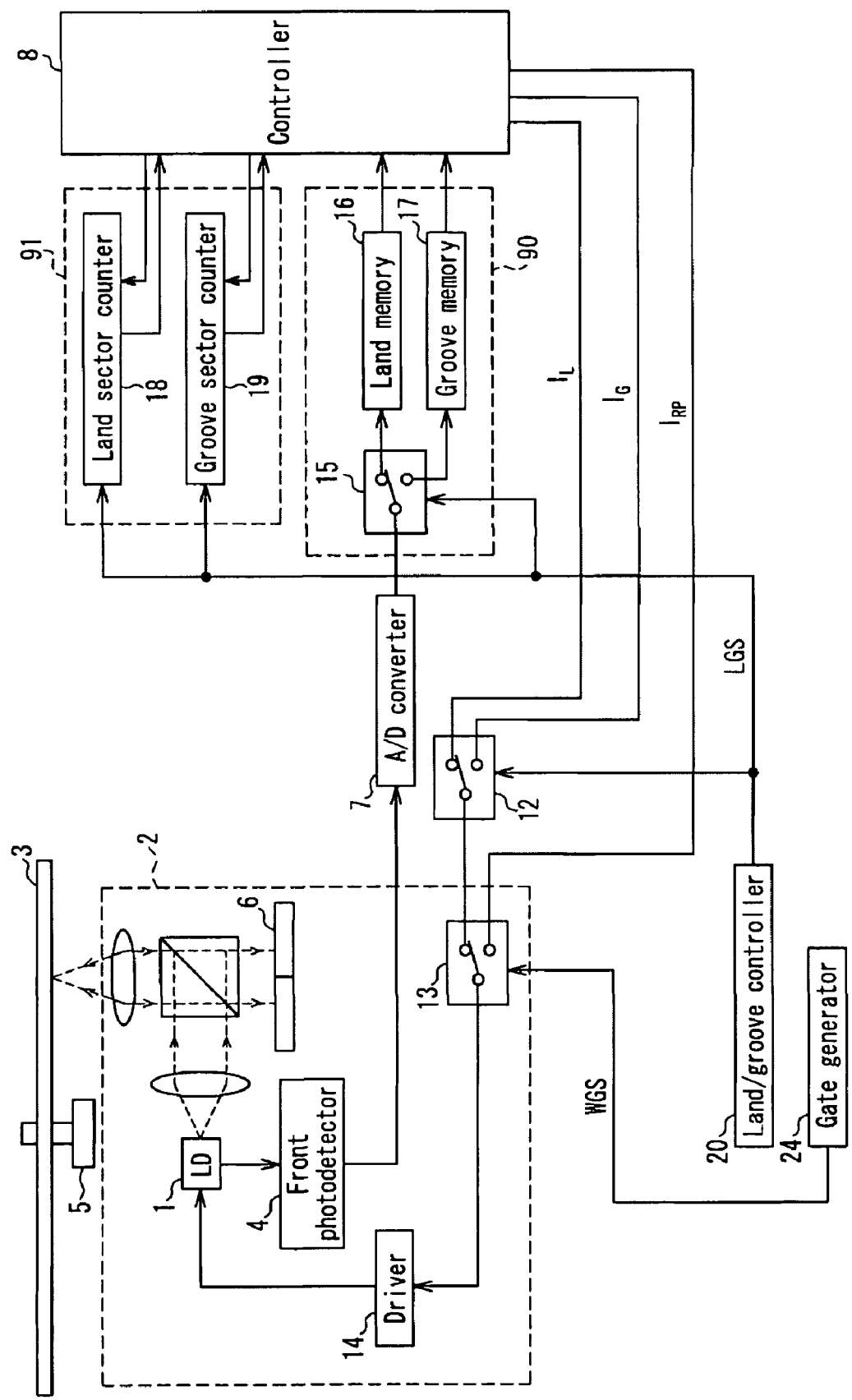
FIG. 1 is a block diagram for explaining the basic concept of a laser power control method of the present invention.

1 Laser
2 Pickup
2a Optical system
3 Optical disk
4 Front photodetector
5 Motor
6 Photodetector
7 A/D converter
8 Controller
9 Land current driving DAC
10 Groove current driving DAC
11 Reproduction current driving DAC
12, 13, 15 Switch
14, 60 Driver
16 Land memory
17 Groove memory
18 Land sector counter
19 Groove sector counter
20 Land/groove controller
21 S/H signal generator
22 Signal processor
23 Recording waveform generator
24 Gate generator
25 Servo microcomputer
26 Recording information generator
27, 28 Low pass filter
90 Storage portion
91 Counter
LX, GX, LZ, GZ Multiplier
LY, GY Memory
LW, GW Adder

BEST MODE FOR CARRYING OUT THE INVENTION

In the laser power control method of the present invention, when none of the counter values of the occurrence for each level is more than the predetermined value, the setting of each of the drive values is not updated for all the levels of the second definition group.

A data recording area of the recording medium is divided into sectors, and when an irradiation position of the laser is located in a gap area of the sector, where no data is recorded and reproduced, the emission power detection value is obtained by monitoring the laser power, and the occurrence is counted in the period during which the emission power detection value is obtained.

Preferably, the laser is driven by selectively switching between a reproduction drive value for reproducing data and a recoding drive value for recording data. The sector includes a reproduction power emission area that is not to be irradiated with the pulse train of the control powers of the first definition group required for recording data, and while the laser is driven to emit light at a reproduction power level by selecting the reproduction drive value in the reproduction power light emission area, the recording drive value is switched stepwise so that the level of the second definition group is changed to another level.

With this configuration, by utilizing the time that the laser emits the reproduction power level before recording data on the recording sector, the corrected drive values can be output so that the recording pulse is set at appropriate power levels beforehand. Therefore, if it is difficult to switch to the optimum recording pulse at high speed after the output level of the optical pulse is detected, the recoding pulse can be switched appropriately at low speed.

Preferably, when the recoding drive value is switched stepwise, a response time is set to be shorter than a time it takes for the irradiation position of the laser passes through the reproduction power light emission area.

The occurrence may be counted each time the irradiation position of the laser passes through the gap area of each sector.

Preferably, the emission power detection values stored and the drive values are used to perform an operation to determine I-L characteristics showing a relationship between a drive current and an optical output of the laser, and the drive values are determined based on the I-L characteristics.

Preferably, while the irradiation position of the laser is located in the gap area, the laser is driven so that a test light emission is performed with a plurality of control powers of the first definition group at a power switching speed lower than that of each of the control powers of the first definition group during recording data.

Preferably, the emission power detection values obtained each time the irradiation position of the laser passes through the gap area are stored as the emission power detection value for each sector, and when the counter value exceeds the predetermined value, an average of the emission power detection values stored for each sector is used to determine collectively the corrected values of the driver values.

Preferably, when an abnormal value that deviates by a predetermined level or more from the control powers of the first definition group included in the level of the corresponding second definition group is obtained as the emission power detection value for each sector, an average is calculated without the abnormal value.

Preferably, the pulse train is formed by driving the laser with the drive values obtained by subjecting the updated drive values to a low-pass filter process using the drive values before the update, thereby suppressing an abrupt change of the drive values before and after the update.

In such a case, the low-pass filter process may be performed by subjecting the drive values before and after the update to an operation so that each of the drive values is multiplied by a predetermined ratio and then added, by using the drive values thus obtained to drive the laser, and by using the drive values as a result of the previous operation as the updated drive values in the next operation.

Hereinafter, a laser power control method and an optical information recording/reproducing apparatus of the present invention will be described in detail with reference to the drawings.

First, the basic concept of the present invention will be described by referring to FIGS. 1 and 2. FIG. 1 is a block diagram showing an optical disk apparatus having a basic configuration for performing a laser power control method of the present invention.

In FIG. 1, a pickup 2 provided with a laser 1 includes a front photodetector 4 that receives a light beam emitted from the laser 1 and converts the power of the light beam into an electric signal. A disk 3 is rotated by a motor 5 at a predetermined rotational speed, and data is recorded on the disk 3 in accordance with the power of the light beam output from the pickup 2. For reproduction, a photodetector 6 receives the light beam that has been emitted from the laser 1 and reflected by the disk 3 and converts the power of the light beam into an electric signal. The disk 3 is described by taking the above DVD-RAM as an example.

The front photodetector 4 converts the power of the received light beam into an electric signal, samples and holds the signal, and outputs the signal to an A/D converter 7. The A/D converter 7 performs an analog-to-digital conversion of the signal input from the front photodetector 4 and then outputs the resultant value to a storage portion 90.

The storage portion 90 includes a land memory 16 and a groove memory 17. The land memory 16 stores the output value of the A/D converter 7 while the light beam passes through a land track. The groove memory 17 stores the output value of the A/D converter 7 while the light beam passes through a groove track. The output value of the A/D converter 7 is switched selectively between the land memory 16 and the groove memory 17 by a switch 15, and is input to either of the memories.

A land/groove controller 20 outputs a land/groove signal (LGS) that is at the L level while the light beam passes through the land track and at the H level while the light beam passes through the groove track. The switch 15 operates in response to the LGS, and the values output from the A/D converter 7 during the passage of the light beam through the gap area are stored in sequence in either the land memory 16 or the groove memory 17.

A counter 91 includes a land sector counter 18 and a groove sector counter 19. The land sector counter 18 counts the number of sectors each time the light beam passes through the gap area of the sector in the land track. The groove sector counter 19 counts the number of sectors each time the light beam passes through the gap area of the sector in the groove track. The land sector counter 18 or the groove sector counter 19 counts up in synchronization with the switching of the levels of the LGS output from the land/groove controller 20. Therefore, the value of the storage portion 90 increases in synchronization with the counting up of the counter 91.

A controller 8 fetches the value from the storage potion 90 when the value of the counter 91 exceeds a predetermined number of sectors. Based on the output value of the storage portion 90, the controller 8 determines drive values required for the laser 1 to output a plurality of recording power levels at which data is recorded on the disk 3, and outputs the drive values to a driver 14 via switches 12, 13. In other words, the controller 8 determines a land drive current $I_L$ to output a power suitable for land track recording and a groove drive current $I_G$ to output a power suitable for groove track recording when detecting that the counter value of the land sector counter 18 or the groove sector counter 19 exceeds the predetermined number of sectors, and outputs each of the drive currents to the driver 14 via the switches 12, 13. The driver 14 holds and outputs the previous drive current value until the drive current is updated by the controller 8, thereby driving the laser 1.

For inputting the drive current to the driver 14, the switch 12 selectively switches between the land and groove drive currents in accordance with the LGS so that the land drive current $I_L$ is selected when the light beam is located in the sector of the land track, and the groove drive current $I_G$ is selected when the light beam is located in the sector of the groove track. Moreover, the input of the drive current to the driver 14 is controlled by the switch 13 in accordance with a write gate signal (WGS) output from a gate generator 24. That is, the WGS indicates a period for the recording powers $P_{PK}$, $P_{B1}$, and $P_{B2}$ to be irradiated on the disk, and the switch 13 is turned on when the WGS is at the H level. Therefore, even if the land drive current or the groove drive current is being output, no recording power is output from the laser 1 when the WGS is at the L level, and a reproduction drive current $I_{RP}$ is output instead.

Next, based on the configuration of FIG. 1, the process of determining the land drive current $I_L$ and the groove drive current $I_G$ by the controller 8 will be described by referring to FIG. 2.

Figure 2:
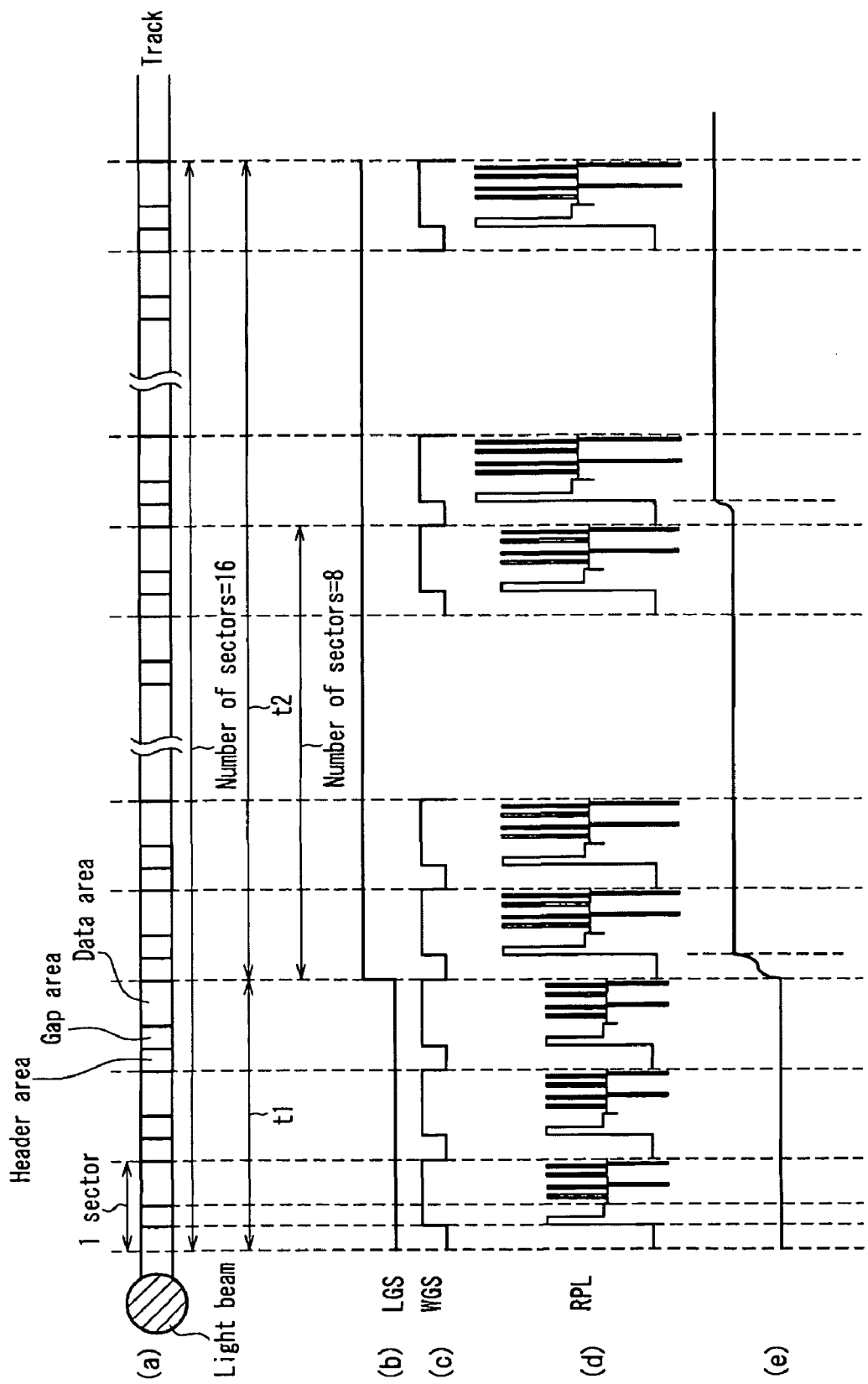
FIG. 2 shows a process for determining a laser drive current with the laser power control method of the present invention.

FIG. 2(a) schematically shows a state in which the light beam moves along a track with the rotation of the disk. The track is divided equally into sectors, and an address area (also referred to as a header area in the following) where an address for identifying the sector is recorded is placed at the beginning of each sector. A gap area where no data to be reproduced is present and no data is to be recorded is placed immediately after the header area. Moreover, a data area for recording data follows the gap area. In FIG. 2, the vertical broken lines indicate a temporal synchronous relationship between the waveforms when the light beam is located in each area of FIG. 2(a). FIG. 2(b) shows the land/groove signal (LGS). The LGS at the L level indicates that the light beam is located in the land track, and the LGS at the H level indicates that the light beam is located in the groove track.

FIG. 2(c) shows the write gate signal (WGS). FIG. 2(d) is a waveform schematically showing levels of the emission power of the laser. FIG. 2(e) is a waveform schematically showing the output of the switch 12.

As described above, a test light emission is performed by switching the power levels at low speed while the light beam passes through the gap area. The power levels used for the test light emission are either Land ($P_{PKL}$, $P_{B1L}$, $P_{B2L}$) or Groove ($P_{PKG}$, $P_{B1G}$, $P_{B2G}$) that are appropriate power levels for recording data on the data area that immediately follows the gap area in the same sector. The switching of the power levels is performed during the passage of the light beam through the header area. It takes 4 μs or more for the light beam to pass through the header area even in the case of 16× speed. Such time is sufficient for switching the power levels in about 3 μs, which is the time needed for switching the outputs of the controller 8. Since the WGS is at the L level during the passage of the light beam through the header area, the laser does not output a power corresponding to the drive current. Accordingly, the data recording is not affected by the time that the power of the laser differs from the appropriate power in response to the switching of the drive currents.

The period t1 indicated by the arrow in FIG. 2 is a length of time during which recording starts at the sector in the land track. The period t1 corresponds to 3 sectors in the example of FIG. 2. The subsequent period t2 is a length of time during which the recording sector is changed from the land track to the groove track. The period t2 corresponds to 13 sectors in the example of FIG. 2. Then, the light beam passes through 16 sectors during the periods t1 and t2, and this number of sectors is defined as a minimum unit of one recording. In the period t1, the controller 8 outputs the predetermined land drive current $I_L$, and the power levels for the test light emission in the gap area in each of 3 sectors are ($P_{PKL}$, $P_{B1L}$) selected from Land ($P_{PKL}$, $P_{B1L}$, $P_{B2L}$).

The output of the A/D converter 7 is stored in the land memory 16 of the storage portion 90 for each sector, and this continues until the land sector counter 18 counts to 3 sectors. The recording sector is changed to the groove track from the fourth sector, so that the output of the controller 8 is switched to the predetermined groove drive current $I_G$ during the passage of the light beam through the header area. In the period t2, the power levels for the test light emission in the gap area are ($P_{PKG}$, $P_{B1G}$) selected from Groove ($P_{PKG}$, $P_{B1G}$, $P_{B2G}$). The output of the A/D converter 7 is stored in the groove memory 17 of the storage portion 90 for each sector, and this continues until the groove sector counter 19 counts to 8 sectors, which is a predetermined number of sectors set in the controller 8.

The power levels selected for the test light emission in the gap area, as described above, also are represented by ($P_{PKT}$, $P_{B1T}$) in the following. Moreover, the drive currents used for the test light emission are represented by ($I_{PKT}$, $I_{B1T}$).

The information corresponding to 8 sectors stored in the groove memory 17 indicates the light emission levels detected by the front photodetector 4 while the laser is driven with the same drive current ($I_{PKG(n-1)}$, $I_{B1G(n-1)}$). Therefore, the light emission levels ideally should be the same, but actually are changed due to the effect of noise during sampling, as described above. The subscript (n−1) of the drive current indicates that the drive current value has been calculated by the previous measurement. The drive current value obtained by the present measurement is identified by the subscript (n).

In this operation, the data is not taken into account if with respect to the intended values of Groove ($P_{PKG}$, $P_{B1G}$, $P_{B2G}$), the data is beyond the range (10%, for example) in which the value is expected to actually change due to tolerance such as a conversion error of the A/D converter 7 or with variations in the temperature characteristics of the laser. Except for the information of the sector containing these data, the information of each sector having the value within tolerance can be averaged, thus obtaining substantially ideal detected powers ($P_{PKG(AVE)}$, $P_{B1G(AVE)}$) from which the effect of noise has been removed. Using the information of drive currents ($I_{PKG(n-1)}$, $I_{B1G(n-1)}$) and the information of detected powers ($P_{PKG(AVE)}$, $P_{B1G(AVE)}$), the controller 8 calculates and updates the land current $I_L$ and the groove current $I_G$ simultaneously as expressed by the following equations.

$$\eta = (P_{PKG(AVE)} - P_{B1G(AVE)})/(I_{PKG(n-1)} - I_{B1G(n-1)})$$

$$I_{th} = I_{B1G(n-1)} - P_{B1G(AVE)}/\eta$$

$$I_{PKL(n)} = 1/\eta \times P_{PKL} + I_{th}$$

$$I_{B1L(n)} = 1/\eta \times P_{B1L} + I_{th}$$

$$I_{B2L(n)} = 1/\eta \times P_{B2L} + I_{th}$$

$$I_{PKG(n)} = 1/\eta \times P_{PKG} + I_{th}$$

$$I_{B1G(n)} = 1/\eta \times P_{B1G} + I_{th}$$

$$I_{B2G(n)} = 1/\eta \times P_{B2G} + I_{th}$$

The controller 8 carries out the above operations repeatedly after clearing the counter values of the land sector counter 18 and the groove sector counter 19. Thus, the land current $I_L$ and the groove current $I_G$ can be calculated and updated simultaneously at substantially regular intervals.

In the conventional technique, the drive current can be updated for each sector at the shortest interval. According to the laser power control with the configuration of the present invention, the drive current is not updated until a minimum of 8 sectors (in the case of the above example) is passed. However, the control method of the present invention is used while the disk is rotated at high speed, and therefore the time needed for the light beam to pass through a sector is shorter than that in the conventional technique (1/16 maximum for 16× speed). On the other hand, the characteristic variations of the laser due to the ambient environment do not depend on the rotational speed of the disk. Thus, the control method of the present invention ensures that the drive current can be updated at a sufficient speed for practical use in accordance with the characteristic variations of the laser.

To determine a drive current beforehand for recording data at the first time, the conventional technique disclosed, e.g., in Patent Document 1 may be applied. Specifically, the above operations of the controller 8 are performed using the gap area of the sector immediately before the sector on which data is to be recorded i.e., the recording sector) so that the WGS is at the H level only in the gap area. In this manner, the drive current that provides a power suitable for the recording sector can be determined without destroying the data recorded on the preceding sector of the recording sector.

In the example as shown in FIGS. 1 and 2, three levels ($P_{PK}$, $P_{B1}$, $P_{B2}$) are set as the control powers of the first definition group, and two types of levels Land ($P_{PKL}$, $P_{B1L}$, $P_{B2L}$) and Groove ($P_{PKG}$, $P_{B1G}$, $P_{B2G}$) are set as the levels of the second definition group. However, the present invention is not limited to this configuration. Even if the first definition group includes a plurality of types of levels as well as the second definition group, the laser power control with the configuration of the present invention can be employed. In the example as shown in FIGS. 1 and 2, although the optical disk is used as a recording medium, the present invention is not limited thereto. Even if the recording medium is not rotated during operation, such as with an optical card, the laser power control with the configuration of the present invention can be employed.

Figure 3A:
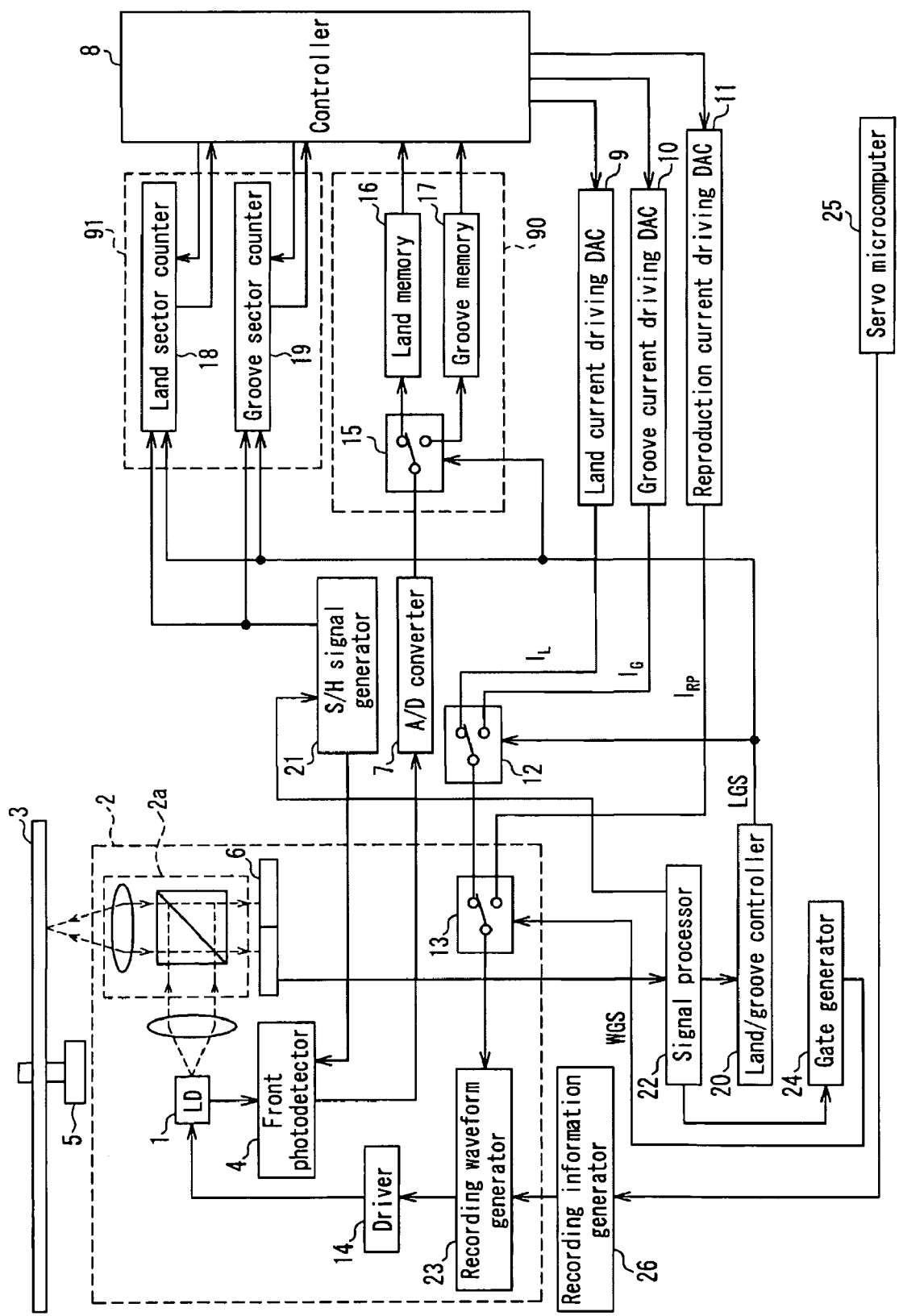
FIG. 3A is a block diagram showing an optical information recording/reproducing apparatus of an embodiment of the present invention.

Next, based on the configuration of FIG. 1, a more detailed description of the configuration and operation of an optical disk apparatus will be provided by referring to the block diagram in FIG. 3A. The basic configuration of the optical disk apparatus in FIG. 3A is similar to that in FIG. 1, and therefore the same components are denoted by the same reference numerals and part of the explanation will not be repeated.

A pickup 2 includes an optical system 2a composed of an objective lens or the like, a front photodetector 4 that receives a light beam emitted from a laser 1 and converts the power of the light beam into an electric signal, and a photodetector 6 that receives the light beam that has been emitted from the laser 1 and reflected by a disk 3 and converts the power of the light beam into an electric signal. The pickup 2 further includes a switch 13, a recording waveform generator 23, and a driver 14.

The pickup 2 is mounted on a carriage (not shown) that is movable in the radial direction of the disk 3, and operates to focus the light beam emitted from the laser 1 onto a track of the disk 3 through the optical system 2a.

The disk 3 is rotated by a motor 5 at a predetermined rotational speed, and data is recorded on the disk 3 in accordance with the power of the light beam output from the pickup 2. The front photodetector 4 detects the power emitted while the light beam passes through the gap area in the sector on which data is to be recorded. Specifically, the front photodetector 4 converts the power of the light beam received when the light beam is located at a predetermined position in the gap area into an electric signal, samples and holds the signal with the timing of each pulse output from a S/H signal generator 21 (as will be described later), and outputs the signal to an A/D converter 7. Properly speaking, at least two power levels (i.e., a peak power level and a bottom power level or an erase power level) are emitted in the gap area, and the S/H signal generator 21 outputs a plurality of pulses with different timing to detect each of the power levels. For convenience, however, these pulses are described collectively as a single pulse in the following.

The A/D converter 7 performs an analog-to-digital conversion of the signal input from the front photodetector 4 and then outputs the resultant value to a switch 15. The switch 15 selectively switches the output value of the A/D converter 7 between a land memory 16 and a groove memory 17 in accordance with two input levels of high (H) and low (L) of a control terminal, and outputs the value to either of the memories. The output of each of the land memory 16 and the groove memory 17 is input to a controller 8.

A land sector counter 18 counts the number of sectors that the light beam passes through while it is located in the land sector. Specifically, the land sector counter 18 counts up when receiving the pulse from the S/H signal generator 21 while a land/groove signal (LGS) output from a land/groove controller 20 is at the L level. Similarly, a groove sector counter 19 counts the number of sectors that the light beam passes through while it is located in the groove sector. Specifically, the groove sector counter 19 counts up when receiving the pulse from the S/H signal generator 21 while the output of the land/groove controller 20 is at the H level.

The LGS is supplied from the land/groove controller 20 to the control terminal of the switch 15. The switch 15 operates to output the value of the A/D converter 7 to the land memory 16 when the LGS is at the L level and to the groove memory 17 when the LGS is at the H level.

The controller 8 monitors the values of the land sector counter 18 and the groove sector counter 19. When either of the counter values is not less than a predetermined value (in this case, 8 sectors), the controller 8 uses the output of the land memory 16 or the groove memory 17 that corresponds to the counter in question for the subsequent operations. That is, when the land sector counter 18 counts 8 sectors or more, the controller 8 uses the output of the land memory 16 for the subsequent operations. When the groove sector counter 19 counts 8 sectors or more, the controller 8 uses the output of the groove memory 17 for the subsequent operations.

The controller 8 carries out an operation based on the value input via either the land memory 16 or the groove memory 17 and calculates current values for driving the laser 1 so that the power of the light beam is equal to each of the following values stored in a memory: three power levels of Land ($P_{PKL}$, $P_{B1L}$, $P_{B2L}$) for land track recording; three power levels of Groove ($P_{PKG}$, $P_{B1G}$, $P_{B2G}$) for groove track recording; and one power level of $P_{RP}$ for reproduction. In other words, the controller 8 determines each of the current values of Land ($I_{PKL}$, $I_{B1L}$, $I_{B2L}$), Groove ($I_{PKG}$, $I_{B1G}$, $I_{B2G}$), and $I_{RP}$ for driving the laser 1 in accordance with the stored power levels and outputs them to a land current driving DAC 9, a groove current driving DAC 10, and a reproduction current driving DAC 11, respectively.

Figure 3B:
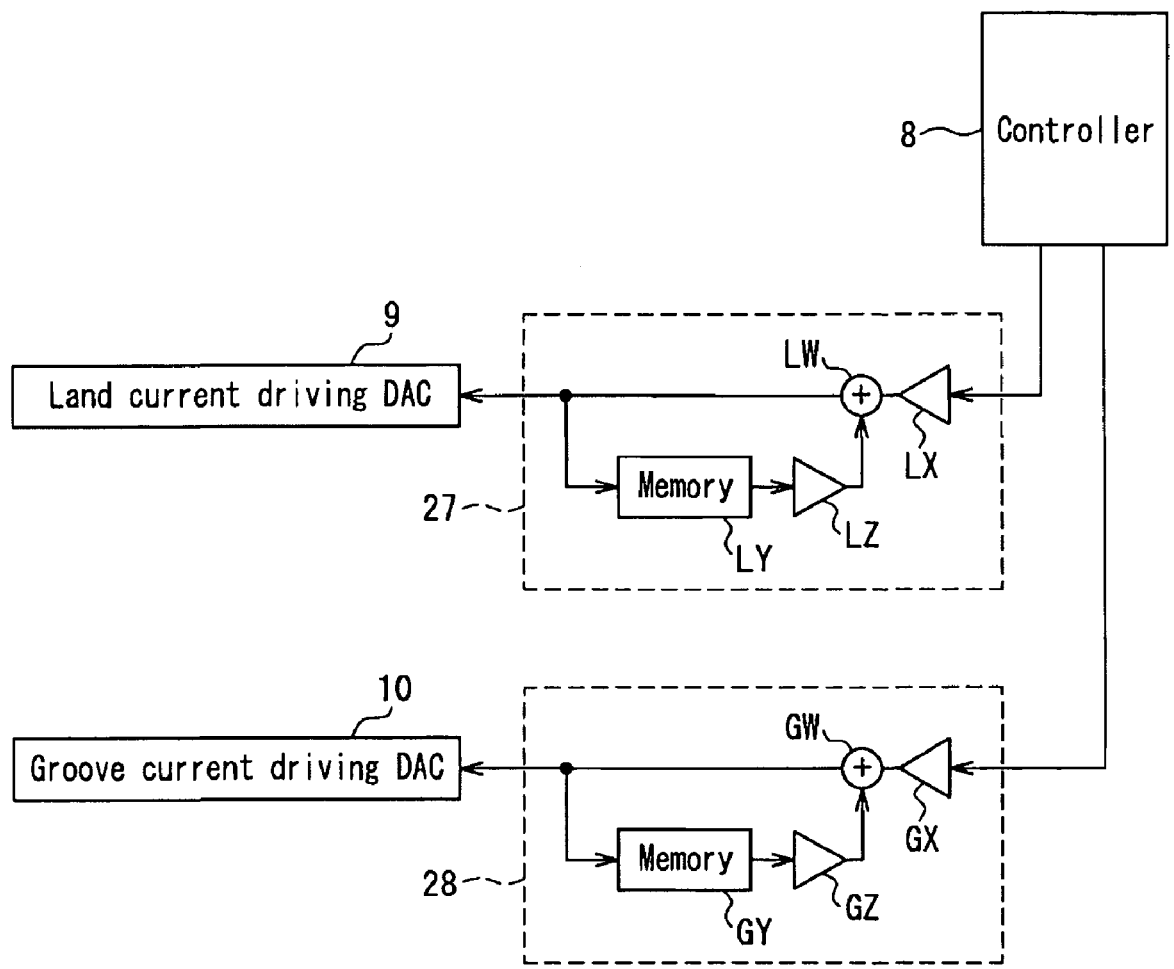
FIG. 3B is a block diagram showing a configuration for improving a part of the optical information recording/reproducing apparatus.

In this case, it is desirable that Land ($I_{PKL}$, $I_{B1L}$, $I_{B2L}$) and Groove ($I_{PKG}$, $I_{B1G}$, $I_{B2G}$) are supplied from the controller 8 to the land current driving DAC 9 and the groove current driving DAC 10 after being processed by low pass filters 27, 28, as shown in FIG. 3B. The low pass filters 27, 28 include multipliers LX, GX, memories LY, GY for storing the current values, multipliers LZ, GZ, and adders LW, GW, respectively.

Land ($I_{PKL}$, $I_{B1L}$, $I_{B2L}$) and Groove ($I_{PKG}$, $I_{B1G}$, $I_{B2G}$) each are subjected to the arithmetic operations of the multipliers LX, GX that reduce the values at a predetermined ratio (e.g., ⅛) and then input to the adders LW, GW. The memories LY, GY store the current values obtained in the previous cycle. The current values stored in the memories LY, GY each are subjected to the arithmetic operations of the multipliers LZ, GZ that reduce the values at a ratio (e.g., ⅞) corresponding to that of the multipliers LX, GX and then input to the adders LW, GW. The values added in the adders LW, GW are output to the land current driving DAC 9 and the groove current driving DAC 10, respectively. The values output to each DAC are used for determining the current values in the next stage, and therefore stored in the respective memories LY, GY.

Each of the outputs of the land current driving DAC 9 and the groove current driving DAC 10 is subjected to a digital-to-analog conversion and input to one of the input terminals of the switch 12. The output of the reproduction current driving DAC 11 also is subjected to a digital-to-analog conversion and input to one of the input terminals of the switch 13. The output of the switch 12 is input to the other input terminal of the switch 13.

The LGS is supplied from the land/groove controller 20 to the control terminal of the switch 12. When the LGS is at the L level, the output of the land current driving DAC 9 is selected and output to the switch 13. When the LGS is at the H level, the output of the groove current driving DAC 10 is selected and output to the switch 13.

A write gate signal (WGS) that is the output of a gate generator 24 is input to the control terminal of the switch 13. When the WGS is at the H level, the output of the switch 12 is selected and output to the recording waveform generator 23. When the WGS is at the L level, the output of the reproduction current driving DAC 11 is selected and output to the recording waveform generator 23. In response to a control signal input from a recording information generator 26, the recording waveform generator 23 switches the four drive current values $I_{PK}$, $I_{B1}$, $I_{B2}$, and $I_{RP}$ input via the switch 13 and outputs the current value to the drive 14. The driver 14 drives the laser 1 based on the input current value.

The output of the photodetector 6 is input to a signal processor 22 and a servo microcomputer 25 as a RF signal that represents the information recorded on the disk 3.

The signal processor 22 is a circuit that reproduces the data recorded on the disk 3 based on the RF signal input from the photodetector 6. The signal processor 22 reproduces an address for identifying the sector of the disk 3 and outputs the address to the land/groove controller 20 and the gate generator 24.

The gate generator 24 detects the position of the light beam in the sector by counting the number of edges of a reference clock (e.g., 467.2 MHz in the case where the DVD-RAM is rotated at 16× speed) used for recording/reproduction, and outputs the WGS in accordance with the detected position and the address input from the signal processor 22. The WGS will be described in detail later by referring to FIG. 6. The WGS is at the H level when the light beam is located in the area other than the address area in the sector on which data is to be recorded. As described above, the WGS is input to the switch 13.

Like the gate generator 24, the land/groove controller 20 detects the position of the light beam in the sector by counting the number of edges of the reference clock, and outputs the LGS in accordance with the detected position and the address input from the signal processor 22. Specifically, the land/groove controller 20 has decided whether the sector that the light beam is currently passing through is placed in the land track or the groove track based on the address information of the preceding sector. In this sector, when the light beam is located at the leading end of the address portion of the disk 3, the land/groove controller 20 outputs the LGS to indicate the land track or the groove track. The LGS at the L level indicates that the light beam is located in the land track, and the LGS at the H level indicates that the light beam is located in the groove track. Therefore, the LGS can serve to identify which level of the second definition group is being used to drive the laser 1. As described above, the output signal of the land/groove controller 20 is input to the switch 15, the land sector counter 18, the groove sector counter 19, and the switch 12.

Like the gate generator 24, the S/H signal generator 21 detects the position of the light beam in the sector by counting the number of edges of the reference clock, and outputs a pulse at the time the light beam reaches a predetermined position in the gap area in accordance with the detected position and the address input from the signal processor 22. The output of the S/H signal generator 21 is input to the front photodetector 4, the land sector counter 18, and the groove sector counter 19.

The microcomputer 25 transmits data to be recorded on the disk 3 to the recording information generator 26. The recording information generator 26 outputs a control signal that provides the recording waveform generator 23 with timing of switching the three drive current values of Land ($I_{PKL}$, $I_{B1L}$, $I_{B2L}$) or Groove ($I_{PKG}$, $I_{B1G}$, $I_{B2G}$) output via the switch 13 so that the recording data transmitted from the microcomputer 25 is modulated based on a predetermined modulation rule (e.g., 8-16 modulation) to form a recording mark to be recorded on the disk 3.

Figure 4:
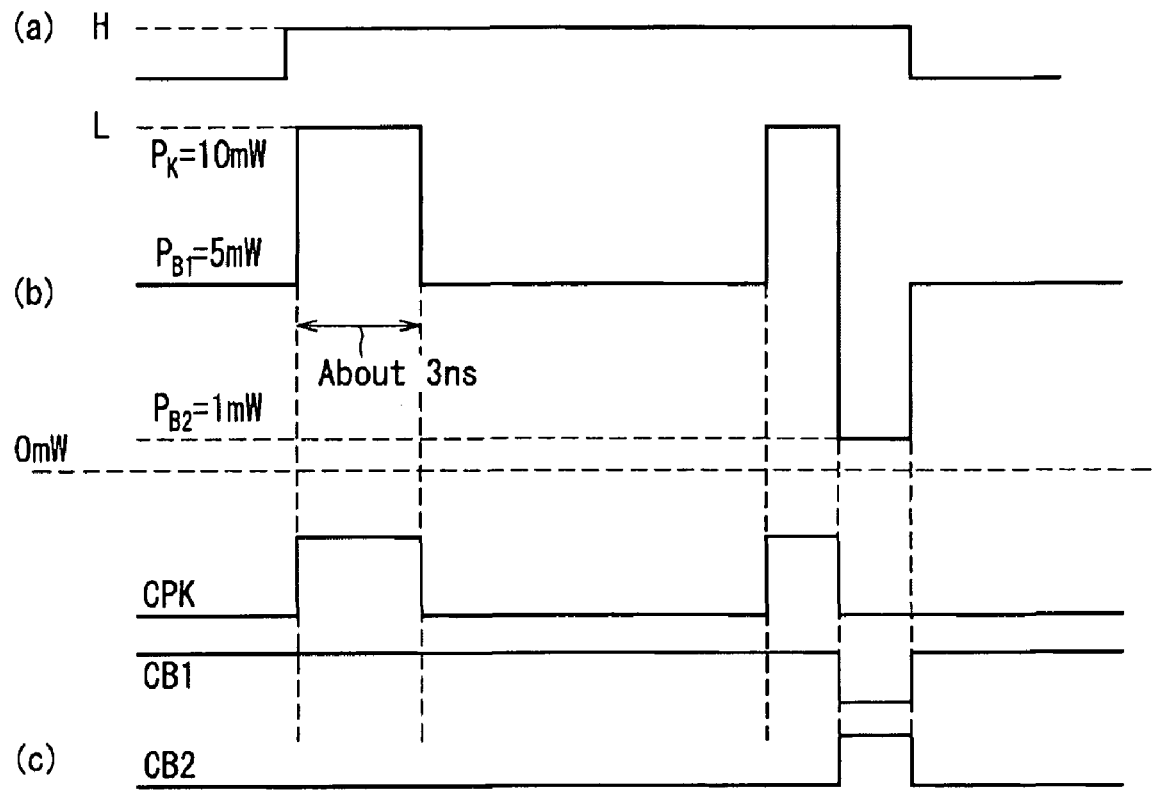
FIG. 4 is a waveform diagram for explaining the operations of a recording information generator 26 and a recording waveform generator 23 in the optical information recording/reproducing apparatus.

FIG. 4 shows the relationship between the control signal output from the recording information generator 26 and the current value switched and selected by the recording waveform generator 23. FIG. 4(a) is a conceptual diagram showing a period during which a recording mark is formed with two levels of high (H) and low (L), and the recording mark is formed on the disk 3 during the H level period. FIG. 4(b) is a conceptual diagram showing powers of the light beam emitted from the laser 1 during the H level period in FIG. 4(a). Based on the broken line represented by 0 mW, three power levels $P_{PK}$=10 mW, $P_{B1}$=5 mW, and $P_{B2}$=1 mW are output.

FIG. 4(c) shows control signals CPK, CB1, and CB2 output from the recording information generator 26 to the recording waveform generator 23. The control signals CPK, CB1, and CB2 indicate timing of switching the individual currents $I_{PK}$, $I_{B1}$, and $I_{B2}$ each time the current is to be selected so that the powers of the light beam emitted from the laser 1 have a waveform as shown in FIG. 4(b). While each of the control signals CPK, CB1, and CB2 is at the H level, the corresponding currents $I_{PK}$, $I_{B1}$, and $I_{B2}$ are selected. The levels of the control signals CPK, CB1, and CB2 in FIG. 4(c) are switched at very high speed, and particularly the timing with which the H level of CPK is switched is about 3 ns. In this embodiment, an element capable of sampling in about 100 ns for one value of a power is used as the front photodetector 4. Therefore, it is not possible to identify each of the three powers of the light beam emitted from the laser 1 during the formation of a recording mark.

Figure 5:
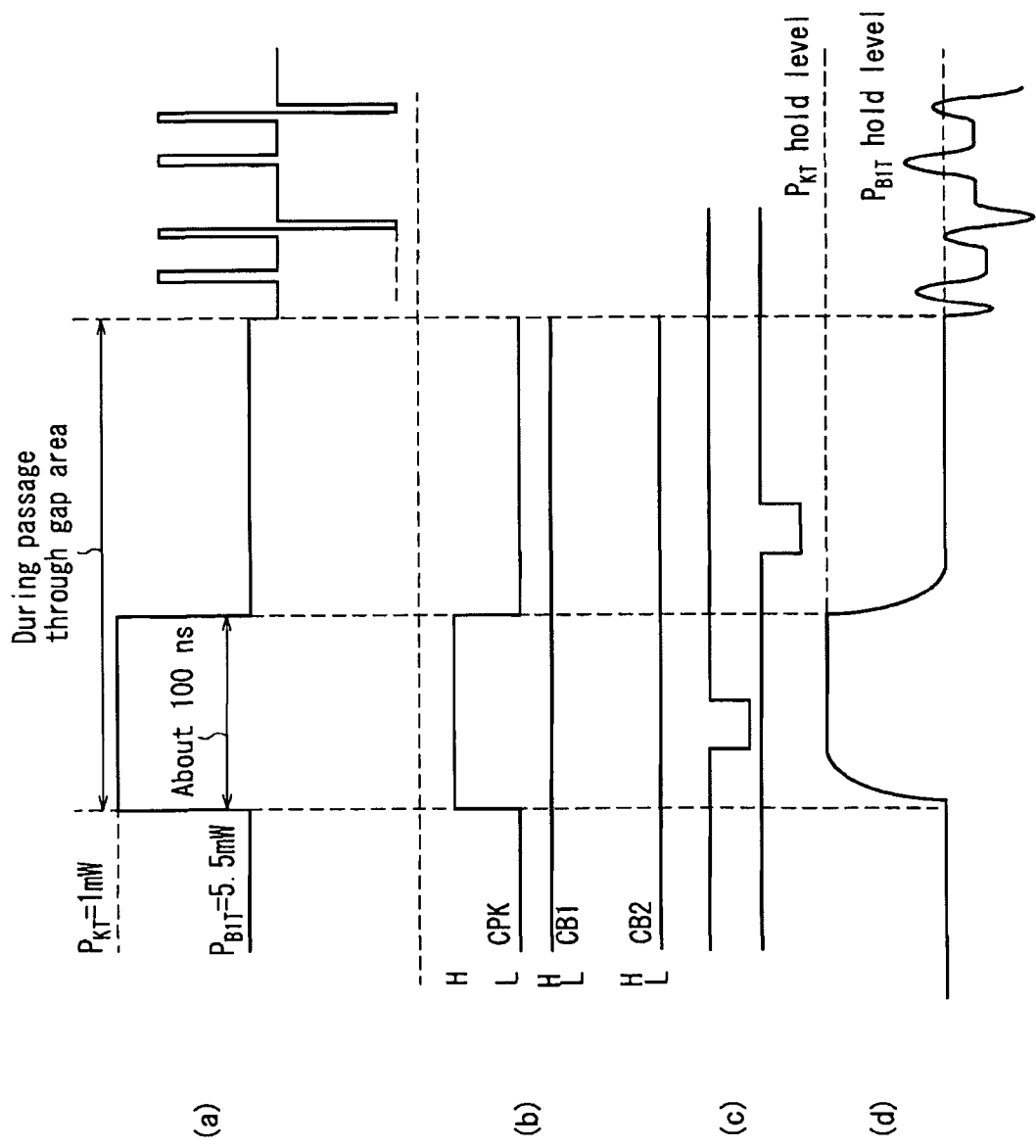
FIG. 5 is a waveform diagram for explaining the operation of a front photodetector 4 in the optical information recording/reproducing apparatus.

FIG. 5 shows the operation of the front photodetector 4 while the light beam scans the gap area. FIG. 5(a) is a conceptual diagram showing power levels emitted from the laser 1. With 0 mV indicated by the broken line as a reference, two power levels $P_{PKT}$=10 mW and $P_{B1T}$=5.5 mW are output. The control signals CPK, CB1, and CB2 shown in FIG. 5(b) are output from the recording information generator 26 to the recording waveform generator 23. While each of the control signals is at the H level, the corresponding currents $I_{PK}$, $I_{B1}$, and $I_{B2}$ are selected. The control signals CPK, CB1, and CB2 indicate timing of switching the individual currents $I_{PKT}$ and $I_{B1T}$ each time the current is selected so that the powers of the light beam emitted from the laser 1 have a waveform as shown in FIG. 5(a).

During the passage of the light beam through the gap area, it is not necessary to output a pulse to form a recording mark. Therefore, the power levels are switched by operating CPK and CB1 at about 100 ns unit (referred to as a test light emission in the following), which can be detected by the front photodetector 4. FIG. 5(c) shows a pulse output from the S/H signal generator 21. FIG. 5(d) shows a waveform immediately after the conversion of the received light into the electric signal by the front photodetector 4. The front photodetector 4 samples and holds each of the power levels $P_{PKT}$ and $P_{B1T}$ with the timing of the pulse in FIG. 5(c) as a level of the waveform in FIG. 5(d).

In recent years, the output of the laser 1 tends to be set significantly larger as the rotational speed of a disk increases further. However, since the range of the voltage detected by the front photodetector 4 does not broaden, the detected voltage per unit optical output thus becomes smaller. This leads to a problem of a low S/N of the detected signal as shown in FIG. 5(d), and the error of the detected signal due to the effect of noise cannot be ignored. To deal with the problem, this embodiment calculates the average of values detected in the gap areas of a plurality of sectors, thereby reducing the error. In this connection, in order to detect the same level in the plurality of sectors, it is necessary to prevent each of the currents $I_{PKT}$, $I_{B1T}$ from being changed. Moreover, depending on the state of noise, the detected levels may deviate considerably from the intended levels $P_{PKT}$, $P_{B1T}$. If such levels are involved in the calculation of the average, the effect of abnormal values cannot be ignored. Thus, it is desirable that the considerable deviation is removed before calculating the average.

There may be various methods to remove the abnormal values. For example, the abnormal values can be removed when the sampled values are beyond a predetermined range. As will be described later, the intended levels $P_{PKT}$, $P_{B1T}$ are powers that are actually used to record data on the data area following the gap area, and $I_{PKT}$, $I_{B1T}$ have been corrected to output appropriate powers. Thus, it can be considered that the values detected in the gap area are unlikely to deviate considerably from the intended levels $P_{PKT}$, $P_{B1T}$. In fact, however, there are some deviations from the intended values because the detected values contain errors caused by offset of the detector or the like. Moreover, it is desirable that the intended values are designed to have a sufficient margin for proper detection with respect to the characteristic variations of the laser due to rapid ambient temperature changes. In the following, an example will be described in which values that deviate ±10% from $I_{PKT}$, $I_{B1T}$ are identified as the abnormal values.

Figure 6:
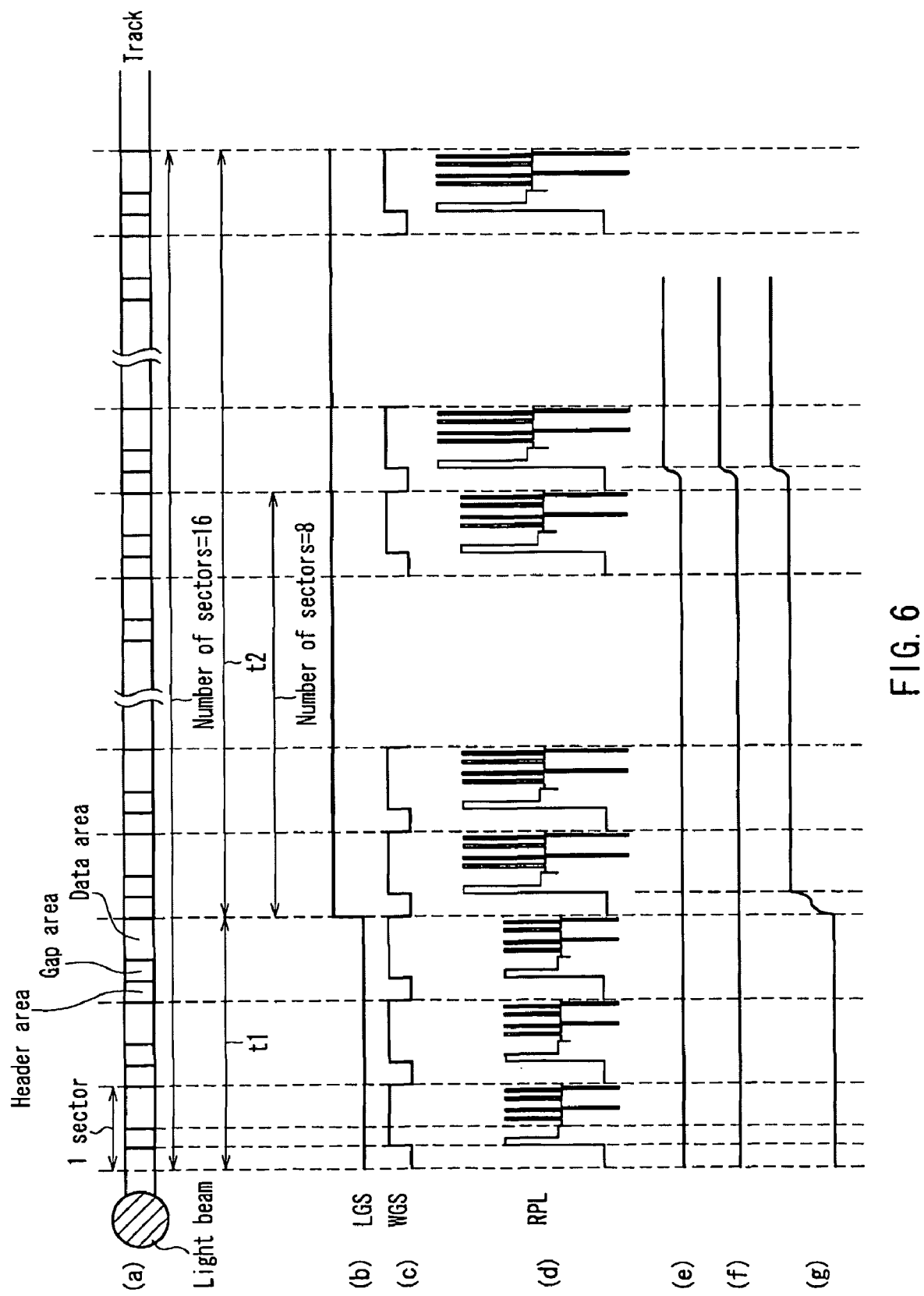
FIG. 6 is a waveform diagram for explaining the sequence of correction of an output of a driver 14 in the optical information recording/reproducing apparatus.
Figure 7:
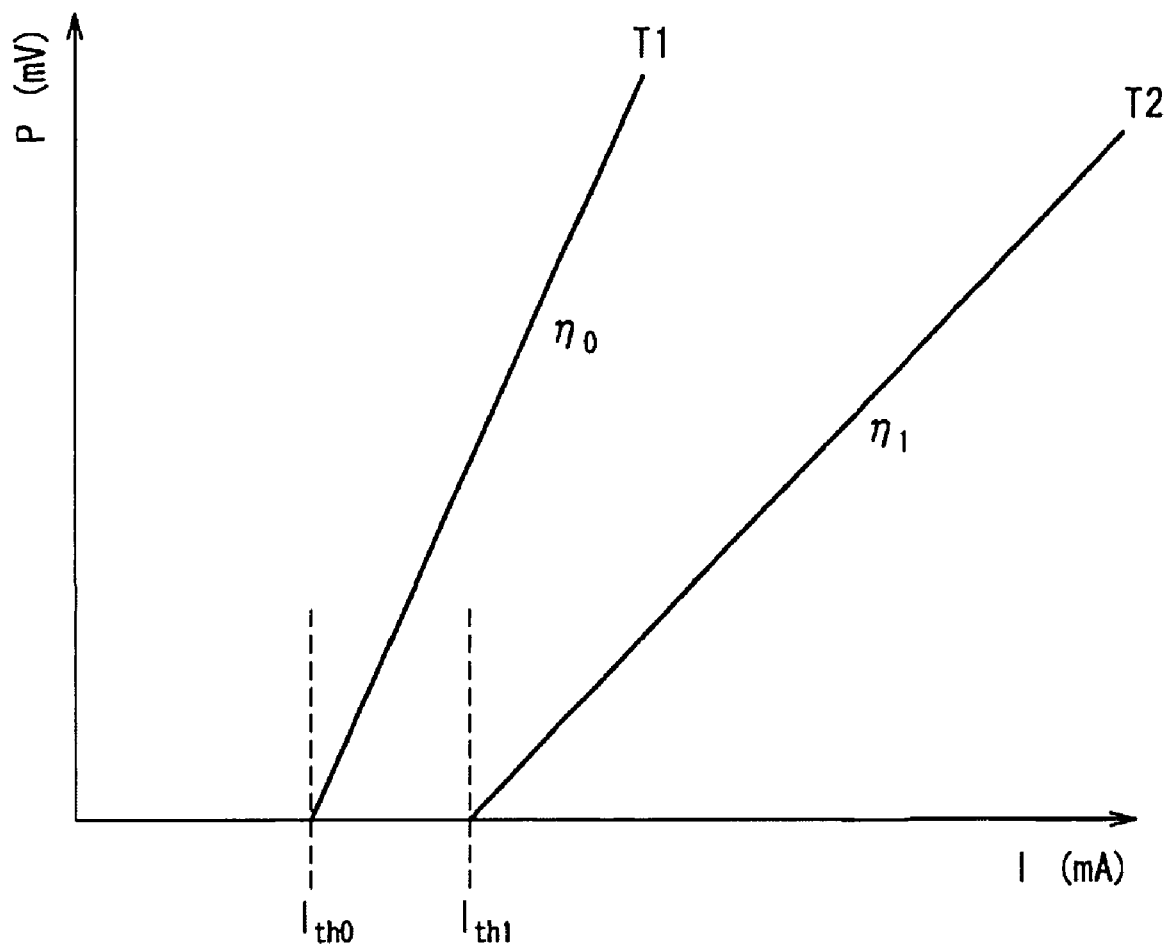
FIG. 7 shows the I-L characteristics of a general laser.
Figure 8:
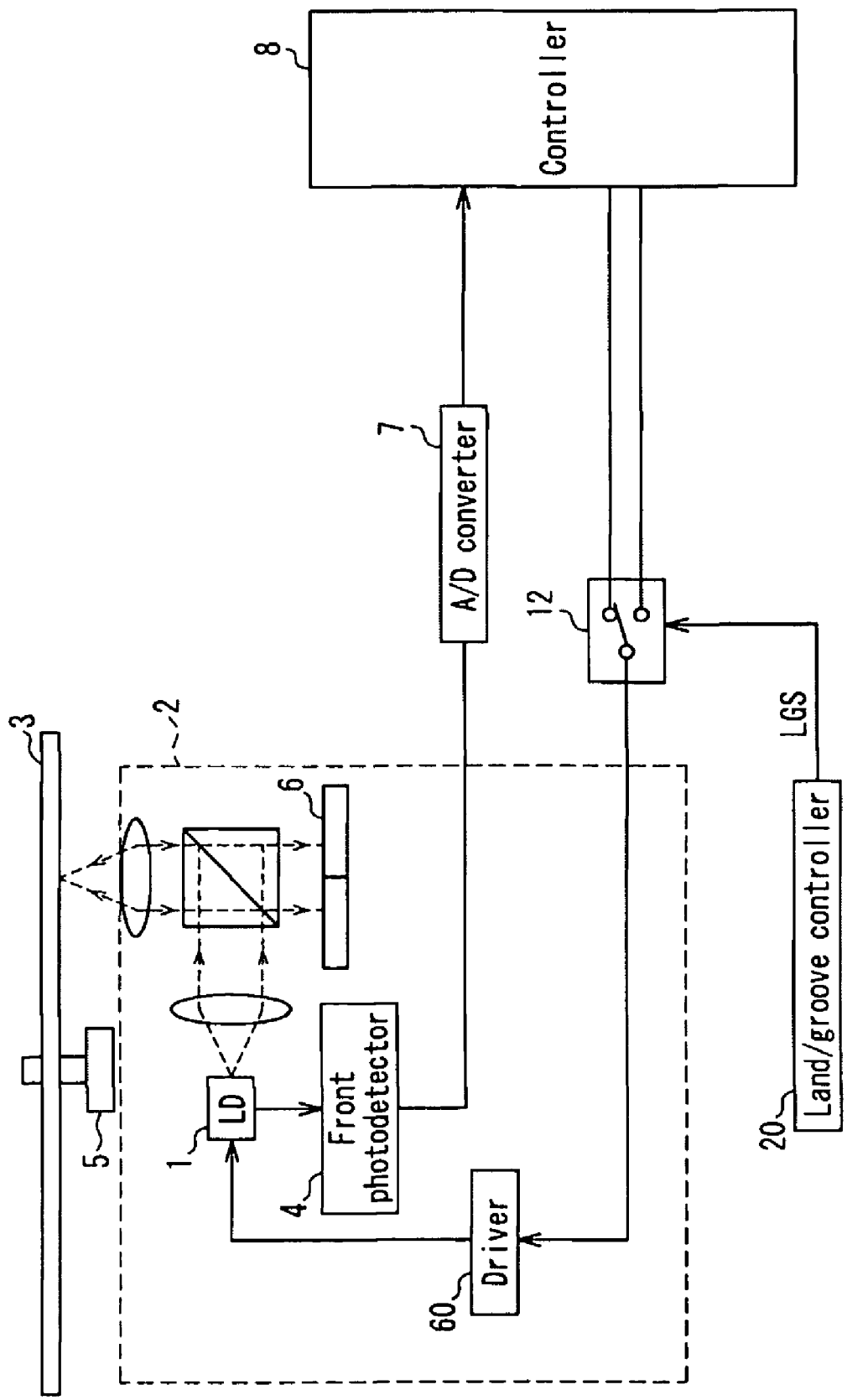
FIG. 8 is a block diagram showing an optical information recording/reproducing apparatus using a conventional laser power control method.
Figure 9:
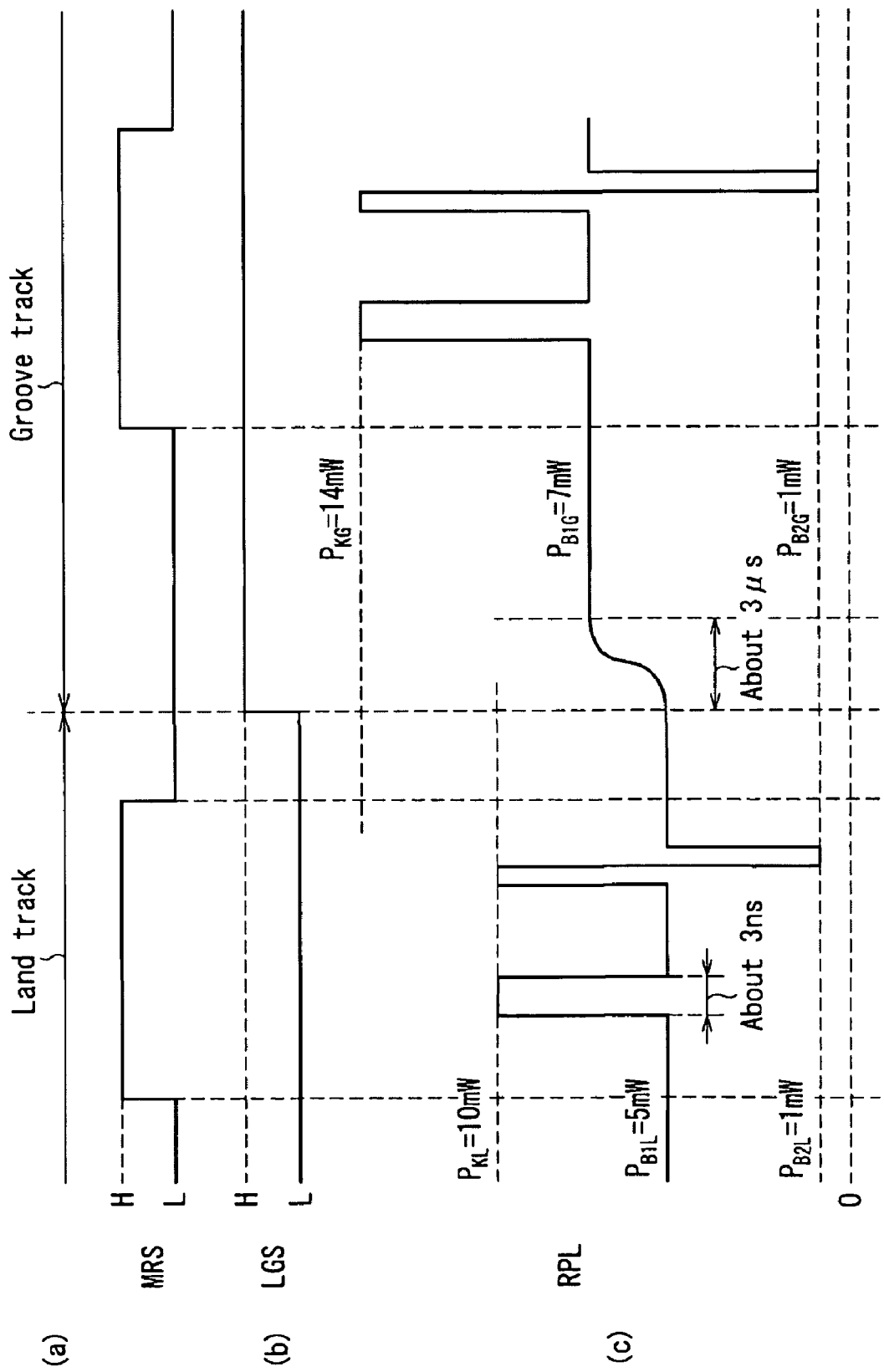
FIG. 9 is a waveform diagram showing an example of three power levels emitted from a laser to form a recording mark in the optical information recording/reproducing apparatus in FIG. 8.
Figure 10:
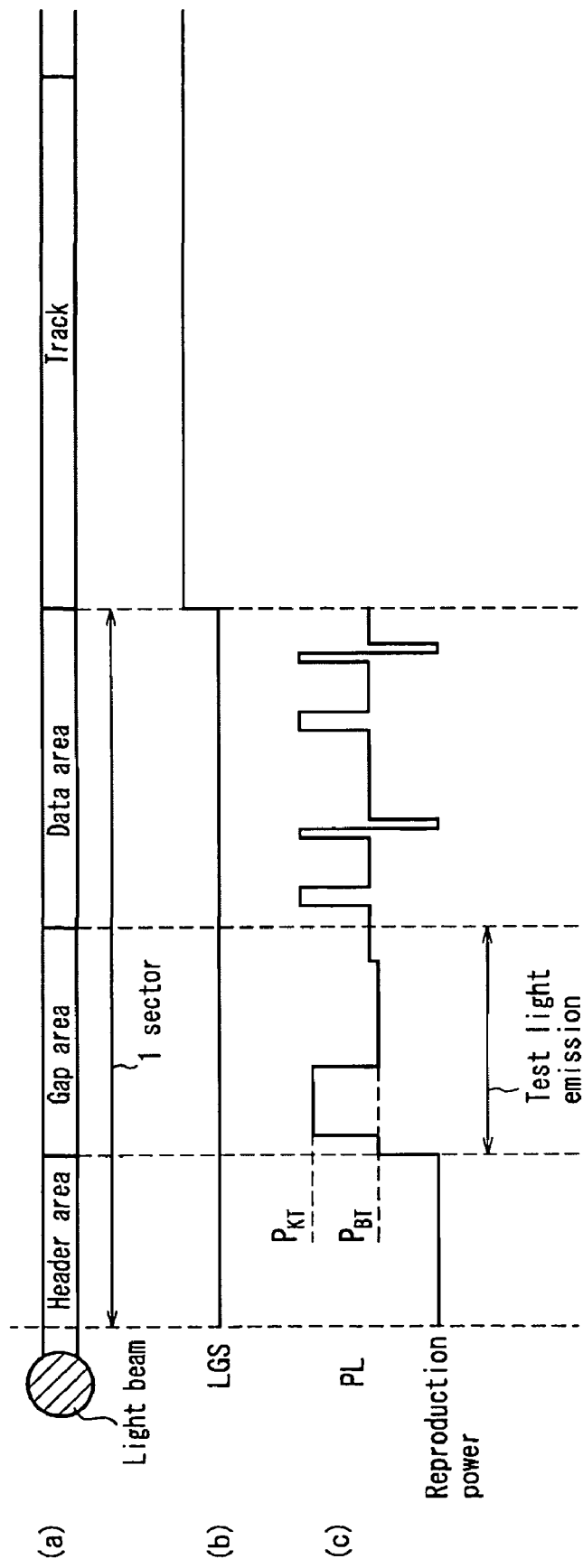
FIG. 10 is a timing chart schematically showing the operation of a test light emission in the optical information recording/reproducing apparatus in FIG. 8.

FIG. 6 shows the sequence of the correction of outputs of the driver 14. Like FIG. 2(a), FIG. 6(a) schematically shows a state in which the light beam moves along a track by rotation of the disk. The track is divided equally into sectors, and a header area where an address for identifying the sector is recorded is placed at the beginning of each sector. A gap area is placed immediately after the header area, and a data area for recording data follows the gap area. In FIG. 6(a), the number of sectors is 16, and this number of sectors is defined as a minimum unit of one recording in the optical disk apparatus. In FIG. 6, the vertical broken lines indicate a temporal synchronous relationship between the waveforms when the light beam is located in each area of FIG. 6(a). The period t1 indicated by the arrow in FIG. 6(a) corresponds to 3 sectors, and these sectors are placed in the land track according to this embodiment. The subsequent period t2 corresponds to 13 sectors that are placed in the groove track.

FIG. 6(b) shows the land/groove signal (LGS) output from the land/groove controller 20. FIG. 6(c) shows the write gate signal (WGS) output from the gate generator 24. FIG. 6(d) is a waveform schematically showing levels of the emission power of the laser 1. FIG. 6(e) shows the output of the land current driving DAC 9. FIG. 6(f) shows the output of the groove current driving DAC 10. FIG. 6(g) is a waveform schematically showing the output of the switch 12. As described above, a test light emission is performed with a low-speed pulse modulation by the recording waveform generator 23 while the light beam passes through the gap area. The power levels used for the test light emission are stored in the memory that is contained in the controller 8. Specifically, the test light emission can use two types of power levels: ($P_{PKL}$, $P_{B1L}$) selected from Land ($P_{PKL}$, $P_{B1L}$, $P_{B2L}$) for land track recording; and ($P_{PKG}$, $P_{B1G}$) selected from Groove ($P_{PKG}$, $P_{B1G}$, $P_{B2G}$) for groove track recording. In this case, a decision on which type of power levels to use is not made as desired, but the appropriate power levels for recording data on the data area that immediately follows the gap area in the same sector are selected. Therefore, in the example of FIG. 6, power levels ($P_{PKL}$, $P_{B1L}$) are output for the test light emission in the gap areas of 3 sectors after the start of recording, and power levels ($P_{PKG}$, $P_{B1G}$) are output for the test light emission in the gap areas of subsequent 13 sectors.

Hereinafter, the sequence of the laser power control with the controller 8 by changing the levels of the test light emission in this embodiment will be described in detail by way of an example in FIG. 6. First, before the light beam reaches the first sector to be subjected to the recording, the drive current values ($I_{PKL}$, $I_{B1L}$, $I_{B2L}$) for outputting Land ($P_{PKL}$, $P_{B1L}$, $P_{B2L}$) have been set to the land current driving DAC 9. Similarly, the drive current values ($I_{PKG}$, $I_{B1G}$, $I_{B2G}$) for outputting Groove ($P_{PKG}$, $P_{B1G}$, $P_{B2G}$) have been set to the groove current driving DAC 10. Moreover, each of the land sector counter 18 and the groove sector counter 19 is set at "zero".

When the light beam passes through the header area of the sector immediately before the first sector, the land/groove controller 20 decides that the first sector to be subjected to the recording is positioned in the land track based on the address information. Then, when the light beam reaches the header area of the first sector, the land/groove controller 20 outputs the LGS at the L level. The switch 12 selects the output of the land current driving DAC 9 and outputs it to the switch 13, since the LGS is at the L level. During the passage of the light beam through the header area, the disk is to be irradiated with a reproduction power. Therefore, the WGS output from the gate generator 24 is at the L level so that the output of the reproduction current driving DAC 11 (not shown in FIG. 6) is selected by the switch 13.

When the light beam reaches the gap area of the first sector, the WGS is changed to the H level, and the outputs of the land current driving DAC 9, i.e., ($I_{PKL}$, $I_{B1L}$, $I_{B2L}$) are input to the driver 14 via the switch 13 and the recording waveform generator 23. Thus, the laser 1 performs a test light emission at power levels of Land ($P_{PKL}$, $P_{B1L}$). This power is detected by the front photodetector 4 and stored in the land memory 16 via the switch 15, since the LGS is at the L level. Here, this information is represented by ($P_{PKL}[1]$, $P_{B1L}[1]$) and distinguished from the information of other sectors. At this time, the light beam is passing through the gap area, and the S/H signal generator 21 outputs a pulse. In response to this pulse, the land sector counter 18 counts to "1", since the LGS is at the L level.

The controller 8 monitors the values of the land sector counter 18 and the groove sector counter 19. In this case, however, neither of the values reaches the internally predetermined value "8", and thus the controller 8 does not carry out an operation for correcting the drive current. When the light beam reaches the data area, data is recorded on the first sector in the following manner. The recording information generator 26 modulates the recording data transmitted from the microcomputer 25. Based on the modulated value, the output of the driver 14 is changed with the timing provided by the recording waveform generator 23. Therefore, the laser 1 emits the light beam with power levels Land ($P_{PKL}$, $P_{B1L}$, $P_{B2L}$) being switched at high speed, as shown in FIG. 6(d). Consequently, a recording mark is formed in the data area of the first sector. While the light beam passes through the first sector, the land/groove controller 20 decides that the LGS for the next sector is at the L level. In the second sector, like the first sector, the values ($P_{PKL}[2]$, $P_{B1L}[2]$) are stored in the land memory 16, and the land sector counter 18 counts to "2". Although the same applies to the third sector, the land/groove controller 20 identifies that the fourth and subsequent sectors are positioned in the groove track based on the address information, and decides that the LGS is at the H level.

When the light beam reaches the header area of the fourth sector, the LGS is changed to the H level, and thus the switch 12 switches the output of the land current driving DAC 9 to the output of the groove current driving DAC 10. As described above, the switch 13, the recording waveform generator 23, and the driver 14 are incorporated into the pickup 2, which is a general configuration as an IC for a laser driver. The pickup 2 is mounted on a carriage and can be moved in the radial direction of the disk. For this reason, the switch 12 mounted on the main substrate side of the optical disk apparatus and the switch 13 mounted on the pickup side are connected with a flexible cable. The cable run length of this cable is longer compared to the connection between other circuits. Moreover, the flexible cable can be deformed depending on the position of the pickup 2 and thus is likely to be affected by noise. If the noise is superimposed on the signal output from the switch 12, the laser 1 is driven abnormally and in a worst case can be broken down. In general, therefore, it is designed to lower the frequency of the signal passing through the cable, e.g., by adding a LPF (low-pass filter) for noise removal. This embodiment is configured so that the cut-off frequency is about 300 kHz.

In this case, it takes about 3 μs to change the output of the switch 12 from the value of the land current driving DAC 9 to the value of the groove current driving DAC 10 and to make it stable. During this period of time, the drive currents are at levels different from those of the appropriate power for recording data on the disk. However, since the WGS is at the L level while the light beam is located in the header area, the signal output from the switch 13 is the value of the reproduction current driving DAC 11. Consequently, the emission power of the laser 1 becomes a reproduction power and thus is not a problem. It takes about 4 μs or more for the light beam to pass through the header area even in the case of 16× speed, and the output of the switch 12 can be switched sufficiently in about 3 μs.

When the light beam reaches the gap area of the fourth sector, the WGS is changed to the H level, and the drive currents ($I_{PKG}$, $I_{B1G}$, $I_{B2G}$) are input to the driver 14 via the switch 13 and the recording waveform generator 23. Thus, the laser 1 performs a test light emission at power levels of ($P_{PKG}$, $P_{B1G}$). This power is detected by the front photodetector 4, and the values ($P_{PKG}[4]$, $P_{B1G}[4]$) are stored in the groove memory 17 via the switch 15, since the LGS is at the H level. At this time, since the light beam is passing through the gap area, the S/H signal generator 21 outputs a pulse. In response to this pulse, the groove sector counter 19 counts to "1", since the LGS is at the H level.

The same operations are repeated in the groove track. In the following, the operation after the light beam has passed through the gap area of the eleventh sector will be described. At this time, the controller 8 monitors the values of the land sector counter 18 and the groove sector counter 19, and detects that the value of the groove sector counter 19 is "8". Then, the controller 8 refers to the data stored in the groove memory 17. For example, among the data of ($P_{PKG}[4]$, $P_{B1G}[4]$) to ($P_{PKG}[11]$, $P_{B1G}[11]$), it is assumed that $P_{PKG}[6]$ and $P_{PKG}[7]$ deviate ±10% or more from the intended value, and that $P_{B1G}[10]$ deviates ±10% or more from the intended value. In such a case, the values sampled in the gap areas of the sixth and seventh sectors are not used as the detected values of $P_{PKG}$, and the remaining values of 6 sectors are added and averaged to give $P_{PKG(AVE)}$. Similarly, the value sampled in the gap area of the tenth sector is not used as the detected value of $P_{B1G}$, and the remaining values of 7 sectors are added and averaged to give $P_{B1G(AVE)}$.

The current values ($I_{PKG(n-1)}$, $I_{B1G(n-1)}$) used to drive the laser 1 for detection of the above powers are constant. Using these values, corrected drive currents that can accommodate variations in the temperature characteristics of the laser 1 are determined based on the following equations (which are the same as those described above).

$$\eta = (P_{PKG(AVE)} - P_{B1G(AVE)})/(I_{PKG(n-1)} - I_{B1G(n-1)})$$

$$I_{th} = I_{B1G(n-1)} - P_{B1G(AVE)}/\eta$$

$$I_{PKL(n)} = 1/\eta \times P_{PKL} + I_{th}$$

$$I_{B1L(n)} = 1/\eta \times P_{B1L} + I_{th}$$

$$I_{B2L(n)} = 1/\eta \times P_{B2L} + I_{th}$$

$$I_{PKG(n)} = 1/\eta \times P_{PKG} + I_{th}$$

$$I_{B1G(n)} = 1/\eta \times P_{B1G} + I_{th}$$

$$I_{B2G(n)} = 1/\eta \times P_{B2G} + I_{th}$$

With specific numerical values, the above operations will be described by taking ($I_{PKL(n)}$, $I_{B1L(n)}$, $I_{B2L(n)}$) as an example. In this case, $P_{B1G(AVE)}$ is 5 mW when $I_{B1G(n-1)}$ is 38 mA, and $P_{PKG(AVE)}$ is 10 mW when $I_{PKG(n-1)}$ is 47 mA. Moreover, $P_{PKL} = 11$ mW, $P_{B1L} = 5.5$ mW, and $P_{B2L} = 1$ mW.

$$\eta = (10-5)/(47-38) = 0.55 \text{(mW/mA)}$$

$$I_{th} = 38 - 5/0.55 = 28.9 \text{(mA)}$$

$$I_{PKL(n)} = 1/0.55 \times 11 + 28.9 = 48.9 \text{(mA)}$$

$$I_{B1L(n)} = 38.9 \text{(mA)}$$

$$I_{B2L(n)} = 30.7 \text{(mA)}$$

In some cases, it is undesirable to drive the laser 1 directly with the drive values obtained by the above operations. For example, this may be true if most of the values other than the abnormal values are approximately ±10% of the intended value in calculating $P_{PKG(AVE)}$, $P_{B1G(AVE)}$. Basically, the drive values have to be updated to follow the characteristic variations of the laser 1 due to ambient temperature changes. In view of this, the sampled values cannot fluctuate by close to 10% within a time that the light beam passes through a plurality of sectors to perform the above operations. Thus, these values that deviate approximately ±10% from the intended value may be errors in determining values that should actually be the drive values. In other words, if the results of the above operations are output, an error of about ±10% may be generated every time the drive values are updated.

When data has been recorded using the drive values based on about a 10% fluctuation and is reproduced, the amplitude of the reproduced signal is changed, which may cause an increase in error bytes of data, depending on the reproducing apparatus. The above method for removing the abnormal values is suitable for removal of an error due to random noise, but not for a case where the laser power is detected while being shifted with some fixed tendency in a short time.

To avoid this problem, the drive values are updated so as not to change by more than a predetermined ratio from the current drive values. Specifically, as shown in FIG. 3B, the corrected current values ($I_{PKL(n)}$, $I_{B1L(n)}$, $I_{B2L(n)}$), ($I_{PKG(n)}$, $I_{B1G(n)}$, $I_{B2G(n)}$) are supplied to the land current driving DAC 9 and the groove current driving DAC 10 after being processed by the low pass filters 27, 28.

The values ($I_{PKL(n)}$, $I_{B1L(n)}$, $I_{B2L(n)}$), ($I_{PKG(n)}$, $I_{B1G(n)}$, $I_{B2G(n)}$) are reduced by multiplying each of them by a predetermined ratio (e.g., ⅛) with the multipliers LX, GX, respectively. The values ($I_{PKL(n-1)}$, $I_{B1L(n-1)}$, $I_{B2L(n-1)}$), ($I_{PKG(n-1)}$, $I_{B1G(n-1)}$, $I_{B2G(n-1)}$) stored in the memories LY, GY are reduced by multiplying each of them by a predetermined ratio (e.g., ⅞) with the multipliers LZ, GZ, respectively. Then the outputs of the multipliers LX and LZ are added, and the outputs of the multipliers GX and GZ are added, yielding values actually to be used as drive values for the laser 1.

To make the explanation easier, the values obtained by the above operations are expressed as ($I_{PKL(C)}$, $I_{B1L(C)}$, $I_{B2L(C)}$), ($I_{PKG(C)}$, $I_{B1G(C)}$, $I_{B2G(C)}$). For example, the value actually to be used for driving is $I_{PKG(C)} = ⅛(I_{PKG(n)}) + ⅞(I_{PKG(n-1)})$. The resultant values ($I_{PKL(C)}$, $I_{B1L(C)}$, $I_{B2L(C)}$), ($I_{PKG(C)}$, $I_{B1G(C)}$, $I_{B2G(C)}$) are used for determining the drive values in the next stage, and therefore stored in the respective memories LY, GY.

By determining the drive values in the above manner, a fluctuation from the previous drive values can be reduced by the process corresponding to a kind of low pass filter that includes the multipliers LX, GX, the memories LY, GY, and the multipliers LZ, GZ. In the example of FIG. 3B, the process of this low pass filter corresponds to the action of a digital filter that defines 8 sectors of values of the land sector counter 18 or the groove sector counter 19 as a sampling period. The corrected currents ($I_{PKL(n)}$, $I_{B1L(n)}$, $I_{B2L(n)}$), ($I_{PKG(n)}$, $I_{B1G(n)}$, $I_{B2G(n)}$) are output simultaneously to the land current driving DAC 9 and the groove current driving DAC 10, respectively.

Although the controller 8 determines and updates $I_{RP}$ in a similar manner, it is also possible to make a correction with a general APC during the passage of the light beam through the header area. This is not a particularly important element for the present invention, and the explanation will be omitted.

Next, the controller 8 resets the values of the land sector counter 18 and the groove sector counter 19 to "zero". Thus, the subsequent second sector is identified as a new first sector, and the groove sector counter 19 continues to count up. The controller 8 repeats the above operations and can update the values to be supplied to the land current driving DAC 9 and the groove current driving DAC 10 at regular intervals.

As described above, the controller 8 outputs and updates the current values ($I_{PKL(C)}$, $I_{B1L(C)}$, $I_{B2L(C)}$) to the land current driving DAC 9 as well as the current values ($I_{PKG(C)}$, $I_{B1G(C)}$, $I_{B2G(C)}$) to the groove current driving DAC 10. Accordingly, the controller 8 utilizes the values sampled in the sectors of the groove track to calculate the drive currents not only for the groove track but also for the land track simultaneously, so that the drive current can be corrected at regular intervals whether the subsequent sector is placed in the land track or the groove track.

Thus, the present invention ensures that the drive currents can always be corrected at substantially regular intervals only by sampling the powers of either the land track or the groove track. Therefore, even if the recording sectors are distributed in the areas identified by discontinuous recording addresses, as in the case of recording data on a random-access disk (e.g., DVD-RAM), the present invention has the advantages that it does not depend on the number of sectors of the existing land tracks or groove tracks, the front photodetector is not affected by noise, and the drive currents can be corrected regularly in a short time that the light beam passes through the sectors.

In the above embodiment, recording is performed on the gap area in each sector of the disk. However, pulses that are switched at low speed in the same concept as the test light emission may be output to the area other than the gap area as long as an error can be corrected. Therefore, in the present invention, it is not essential to use a recording medium having gap areas. Moreover, the present invention is widely applicable to a recording medium in which data should be recorded by modulating a recording pulse at a plurality of levels with high frequency and by changing the amplitude of the recording pulse itself at a plurality of levels.

INDUSTRIAL APPLICABILITY

According to the laser power control method of the present invention, the emission power of a laser can be detected while suppressing the effect of noise. Moreover, even if different aspects of the recording tracks are likely to appear at random, the emission power can be detected easily and reliably at a plurality of times. Therefore, the laser power control method of the present invention is useful for recording data on a DVD-RAM that is rotated at high speed.

The invention claimed is:

1. A laser power control method comprising:
setting each of control powers of a first definition group that correspond to a pulse train used to form a recording mark, so that data is recorded on a recording medium with the pulse train composed of laser powers of a plurality of levels;
setting a plurality of levels constituting a second definition group that comprises each of the control powers of the first definition group in accordance with different states of the recording medium for recording data on the recording medium;
setting each of drive values for driving the laser with each of the control powers at each of the levels of the second definition group; and
driving the laser by switching the drive values stepwise so that each of the control powers of the first definition group is set to be a predetermined level of the second definition group for recording data on the recording medium,
wherein a plurality of control powers are selected from each of the control powers of the first definition group included in the level that is selected in accordance with predetermined conditions of the second definition group, and when the laser is driven with the drive values corresponding to the selected control powers, the laser power is monitored to obtain an emission power detection value,
wherein the emission power detection value is stored for each level of the second definition group, and a number of an occurrence of a period during which the emission power detection value is obtained is counted for each level of the second definition group, and
wherein when any of counter values of the occurrence for each level exceeds a predetermined value, using the emission power detection values stored for one level of the second definition group corresponding to the counter value that has exceeded the predetermined value, corrected values of the corresponding drive values are determined collectively, and setting of each of the drive values is updated for all the levels of the second definition group.

2. The laser power control method according to claim 1, wherein when none of the counter values of the occurrence for each level is more than the predetermined value, the setting of each of the drive values is not updated for all the levels of the second definition group.

3. The laser power control method according to claim 1, wherein a data recording area of the recording medium is divided into sectors, and when an irradiation position of the laser is located in a gap area of the sector, where no data is recorded and reproduced, the emission power detection value is obtained by monitoring the laser power, and the occurrence is counted in the period during which the emission power detection value is obtained.

4. The laser power control method according to claim 3, wherein the laser is driven by selectively switching between a reproduction drive value for reproducing data and a recording drive value for recording data, the sector includes a reproduction power emission area that is not to be irradiated with the pulse train of the control powers of the first definition group required for recording data, and while the laser is driven to emit light at a reproduction power level by selecting the reproduction drive value in the reproduction power light emission area, the recording drive value is switched stepwise so that the level of the second definition group is changed to another level.

5. The laser power control method according to claim 4, wherein when the recording drive value is switched stepwise, a response time is set to be shorter than a time it takes for the irradiation position of the laser passes through the reproduction power light emission area.

6. The laser power control method according to claim 3, wherein the occurrence is counted each time the irradiation position of the laser passes through the gap area of each sector.

7. The laser power control method according to claim 1, wherein the emission power detection values stored and the drive values are used to perform an operation to determine 1-L characteristics showing a relationship between a drive current and an optical output of the laser, and the drive values are determined based on the I-L characteristics.

8. The laser power control method according to claim 3, wherein while the irradiation position of the laser is located in the gap area, the laser is driven so that a test light emission is performed with a plurality of control powers of the first definition group at a power switching speed lower than that of each of the control powers of the first definition group during recording data.

9. The laser power control method according to claim 6, wherein the emission power detection values obtained each time the irradiation position of the laser passes through the gap area are stored as the emission power detection value for each sector, and when the counter value exceeds the predetermined value, an average of the emission power detection values stored for each sector is used to determine collectively the corrected values of the driver values.

10. The laser power control method according to claim 9, wherein when an abnormal value that deviates by a predetermined level or more from the control powers of the first definition group included in the level of the corresponding second definition group is obtained as the emission power detection value for each sector, an average is calculated without the abnormal value.

11. The laser power control method according to claim 1, wherein the pulse train is formed by driving the laser with the drive values obtained by subjecting the updated drive values to a low-pass filter process using the drive values before the update, thereby suppressing an abrupt change of the drive values before and after the update.

12. The laser power control method according to claim 11, wherein the low-pass filter process is performed by subjecting the drive values before and after the update to an operation so that each of the drive values is multiplied by a predetermined ratio and then added, by using the drive values thus obtained to drive the laser, and by using the drive values as a result of the previous operation as the updated drive values in the next operation.

13. An optical information recording/reproducing apparatus configured so that data is recorded on a recording medium with a pulse train composed of laser powers of a plurality of levels, each of control powers of a first definition group that correspond to the pulse train used to form a recording mark is set, a plurality of levels constituting a second definition group that comprises each of the control powers of the first definition group in accordance with different states of the recording medium for recording data on the recording medium are set, each of drive values for driving the laser with each of the control powers at each of the levels of the second definition group is set, and the laser is driven by switching the drive values stepwise so that each of the control powers of the first definition group is set to be a predetermined level of the second definition group for recording data on the recording medium, the apparatus comprising:

a photodetector that obtains an emission power detection value by monitoring the laser power output from the laser;

a plurality of information storage portions that store the emission power detection value from the photodetector for each level of the second definition group;

a controller that determines corrected values of each of the drive values based on the emission power detection values stored in the information storage portions, and updates the setting of each of the drive values;

a driver that drives the laser based on each of the drive values;

an identification information output portion that outputs identification information that identifies which level of the second definition group an irradiation position of the laser on the recording medium corresponds to; and a plurality of counters that count an occurrence for each level of the second definition group in a period during which the emission power detection value is obtained from the photodetector;

wherein a plurality of control powers are selected from each of the control powers of the first definition group included in the level that is selected in accordance with predetermined conditions of the second definition group, and the emission power detection value is obtained when the laser is driven with the drive values corresponding to the selected control powers, wherein the information storage portion in which the emission power detection value is to be stored and the counter in which the occurrence is to be counted in the period are selected based on the identification information, and wherein when any of counter values of the counters exceeds a predetermined value, the controller uses the emission power detection values stored for one level of the second definition group corresponding to the counter that has exceeded the predetermined value, collectively determines corrected values of the corresponding drive values, and updates the setting of each of the drive values.

* * * * *